(12) United States Patent
O'Rourke

(10) Patent No.: US 12,511,327 B1
(45) Date of Patent: Dec. 30, 2025

(54) SYSTEMS AND METHOD FOR DYNAMICALLY ALTERING MEDIA IN SLIDESHOWS

(71) Applicant: Bret Patrick O'Rourke, Mukilteo, WA (US)

(72) Inventor: Bret Patrick O'Rourke, Mukilteo, WA (US)

( * ) Notice: Subject to any disclaimer, the term of this patent is extended or adjusted under 35 U.S.C. 154(b) by 0 days.

(21) Appl. No.: 19/080,550

(22) Filed: Mar. 14, 2025

(51) Int. Cl.
*G06F 16/438* (2019.01)
*G06F 16/435* (2019.01)

(52) U.S. Cl.
CPC ........ *G06F 16/4393* (2019.01); *G06F 16/435* (2019.01)

(58) Field of Classification Search
CPC ...... G06F 16/43; G06F 16/434; G06F 16/435; G06F 16/4393; G06F 16/44; G06F 16/48; G06F 16/489; G06F 16/9535
See application file for complete search history.

(56) References Cited

U.S. PATENT DOCUMENTS

| | | | |
|---|---|---|---|
| 8,620,110 B2 | 12/2013 | Hertz et al. | |
| 9,152,713 B1* | 10/2015 | Henzinger | G06F 16/9535 |
| 10,743,068 B2 | 8/2020 | Cruz Huertas et al. | |
| 11,417,094 B2 | 8/2022 | Hibino et al. | |
| 12,093,600 B1 | 9/2024 | Frieder et al. | |
| 2007/0233671 A1* | 10/2007 | Oztekin | G06F 16/9535 |
| | | | 707/999.005 |
| 2008/0028036 A1* | 1/2008 | Slawson | H04L 67/02 |
| | | | 709/217 |
| 2012/0108293 A1 | 5/2012 | Law et al. | |
| 2015/0039621 A1 | 2/2015 | Mikolajczyk et al. | |
| 2015/0178280 A1* | 6/2015 | DiMaria | H04N 21/812 |
| | | | 707/736 |
| 2015/0370888 A1* | 12/2015 | Fonseca E Costa | G06F 16/4393 |
| | | | 707/738 |
| 2017/0185670 A1* | 6/2017 | Dua | G06F 16/50 |
| 2021/0390136 A1 | 12/2021 | Desmond et al. | |
| 2023/0342386 A1 | 10/2023 | Frieder et al. | |

FOREIGN PATENT DOCUMENTS

EP 2 876 641 A1 5/2015
EP 2 989 781 A1 3/2016

* cited by examiner

*Primary Examiner* — Alicia M Willoughby
*Assistant Examiner* — Cheryl M Shechtman
(74) *Attorney, Agent, or Firm* — Knobbe, Martens, Olson & Bear, LLP

(57) ABSTRACT

Systems and method for dynamically altering media in slideshows are provided. In one aspect, a system for dynamically altering media slideshows includes an interface configured to provide a slideshow, a processor, and memory hardware storing instructions that cause the processor to perform operations. The operations include obtaining a plurality of metadata search queries, and executing the metadata search queries to identify a plurality of media files from a database of media files. Each of the metadata search queries generates a corresponding metadata group including the media files identified by the corresponding metadata search. Each of the metadata groups has a corresponding first weighted frequency value. The operations also include selecting a first set of media files from each of the metadata groups based on the corresponding first weighted frequency value, and generating the slideshow based on the selected first set of media files.

17 Claims, 12 Drawing Sheets

SYSTEMS AND METHOD FOR DYNAMICALLY ALTERING MEDIA IN SLIDESHOWS

BACKGROUND

Technological Field

This disclosure relates to generating and dynamically altering media used in slideshows.

Description of the Related Technology

Media including photos and videos can be organized into slideshows for viewing by a user. Often, slideshows can be displayed on dedicated digital photo frames, but can also be displayed on various different display technologies. As the ease of generating libraries of media increases, it becomes more difficult for a user to select their desired media from their libraries for inclusion in a slideshow.

SUMMARY OF CERTAIN INVENTIVE ASPECTS

In one aspect there is provided a system for dynamically altering media slideshows, comprising: at least one interface configured to provide a slideshow to a digital screen and/or a digital surface; at least one processor; and memory hardware in communication with the at least one processor, the memory hardware storing instructions that when executed on the at least one processor cause the at least one processor to perform operations comprising: obtaining a plurality of metadata search queries; executing the metadata search queries to identify a plurality of media files from a database of media files, each of the metadata search queries generating a corresponding metadata group including the media files identified by the corresponding metadata search, and each of the metadata groups having a corresponding first weighted frequency value; selecting a first set of media files from each of the metadata groups based on the corresponding first weighted frequency value; and generating the slideshow based on the selected first set of media files.

In some embodiments, executing the metadata search queries is performed at a regular interval in order to find: i) new or removed media files from the database of media files that satisfies one or more of the metadata search queries, and ii) existing media files within the database of media files with metadata that has been updated that satisfies the one or more of the metadata search queries.

In some embodiments, the instructions are further configured to cause the at least one processor to perform operations comprising: creating a folder group including a user selection of the media files from the database of media files, the folder group including a corresponding second weighted frequency value; and selecting a second set of media files from the folder group based on the corresponding second weighted frequency value, wherein generating the slideshow is further based on the selected second set of media files.

In some embodiments, the instructions are further configured to cause the at least one processor to perform operations comprising: creating a context group including a context rule and a context trigger, the context group including a corresponding third weighted frequency value; and in response to detecting the triggering of the context trigger: selecting a third set of media files from the database of media files based on the context rule, and modifying the slideshow to include at least some of the third set of media files based on the third weighted frequency value.

In some embodiments, modifying the slideshow is performed while the slideshow is being displayed on the digital screen and/or the digital surface.

In some embodiments, the system further comprises: a context sensor configured to detect changes in an environment of the digital screen and/or the digital surface, wherein detecting the triggering of the context trigger is further based on the detected changes in the environment.

In some embodiments, the instructions are further configured to cause the at least one processor to perform operations comprising: creating a folder group including a user selection of the media files from the database of media files, the folder group including a corresponding second weighted frequency value; creating a context group including a context rule and a context trigger, the context group including a corresponding third weighted frequency value; and selecting a second set of media files and a third set of media files from the folder group based on the second and third weighted frequency values, wherein generating the slideshow is further based on the selected second and third sets of media files.

In some embodiments, the system further comprises: a management user interface configured to receive a user input, wherein the instructions are further configured to cause the at least one processor to perform operations comprising: setting the first, second, and third weighted frequency values based on the user input, the first, second, and third weighted frequency values being within a weighted frequency number range.

In some embodiments, the database of media files is stored in the cloud.

In another aspect, there is provided a method, comprising: obtaining a plurality of metadata search queries; executing the metadata search queries to identify a plurality of media files from a database of media files, each of the metadata search queries generating a corresponding metadata group including the media files identified by the corresponding metadata search, and each of the metadata groups having a corresponding first weighted frequency value; selecting a first set of media files from each of the metadata groups based on the corresponding first weighted frequency value; generating a slideshow based on the selected first set of media files; and providing the slideshow to a digital screen and/or a digital surface.

In some embodiments, executing the metadata search queries is performed at a regular interval in order to find: i) new or removed media files from the database of media files that satisfies one or more of the metadata search queries, and ii) existing media files within the database of media files with metadata that has been updated that satisfies the one or more of the metadata search queries.

In some embodiments, the method further comprises: creating a folder group including a user selection of the media files from the database of media files, the folder group including a corresponding second weighted frequency value; and selecting a second set of media files from the folder group based on the corresponding second weighted frequency value, wherein generating the slideshow is further based on the selected second set of media files.

In some embodiments, the method further comprises: creating a context group including a context rule and a context trigger, the context group including a corresponding third weighted frequency value; and in response to detecting the triggering of the context trigger: selecting a third set of media files from the database of media files based on the context rule, and modifying the slideshow to include at least some of the third set of media files based on the third weighted frequency value.

In some embodiments, modifying the slideshow is performed while the slideshow is being displayed on the digital screen and/or the digital surface.

In some embodiments, the method further comprises: detecting, using a context sensor, changes in an environment of the digital screen and/or the digital surface, wherein detecting the triggering of the context trigger is further based on the detected changes in the environment.

In some embodiments, the method further comprises: creating a folder group including a user selection of the media files from the database of media files, the folder group including a corresponding second weighted frequency value; creating a context group including a context rule and a context trigger, the context group including a corresponding third weighted frequency value; and selecting a second set of media files and a third set of media files from the folder group based on the second and third weighted frequency values, wherein generating the slideshow is further based on the selected second and third sets of media files.

In some embodiments, the method further comprises: receiving, from a management user interface, a user input; and setting the first, second, and third weighted frequency values based on the user input, the first, second, and third weighted frequency values being within a weighted frequency number range.

In some embodiments, the database of media files is stored in the cloud.

In yet another aspect, there is provided a non-transitory computer-readable medium having stored therein instructions that, when executed by data processing hardware, cause the data processing hardware to: obtain a plurality of metadata search queries; execute the metadata search queries to identify a plurality of media files from a database of media files, each of the metadata search queries generating a corresponding metadata group including the media files identified by the corresponding metadata search, and each of the metadata groups having a corresponding first weighted frequency value; select a first set of media files from each of the metadata groups based on the corresponding first weighted frequency value; generate a slideshow based on the selected first set of media files; and provide the slideshow to a digital screen and/or a digital surface.

In some embodiments, executing the metadata search queries is performed at a regular interval in order to find: i) new or removed media files from the database of media files that satisfies one or more of the metadata search queries, and ii) existing media files within the database of media files with metadata that has been updated that satisfies the one or more of the metadata search queries.

DETAILED DESCRIPTION

Figure 1:
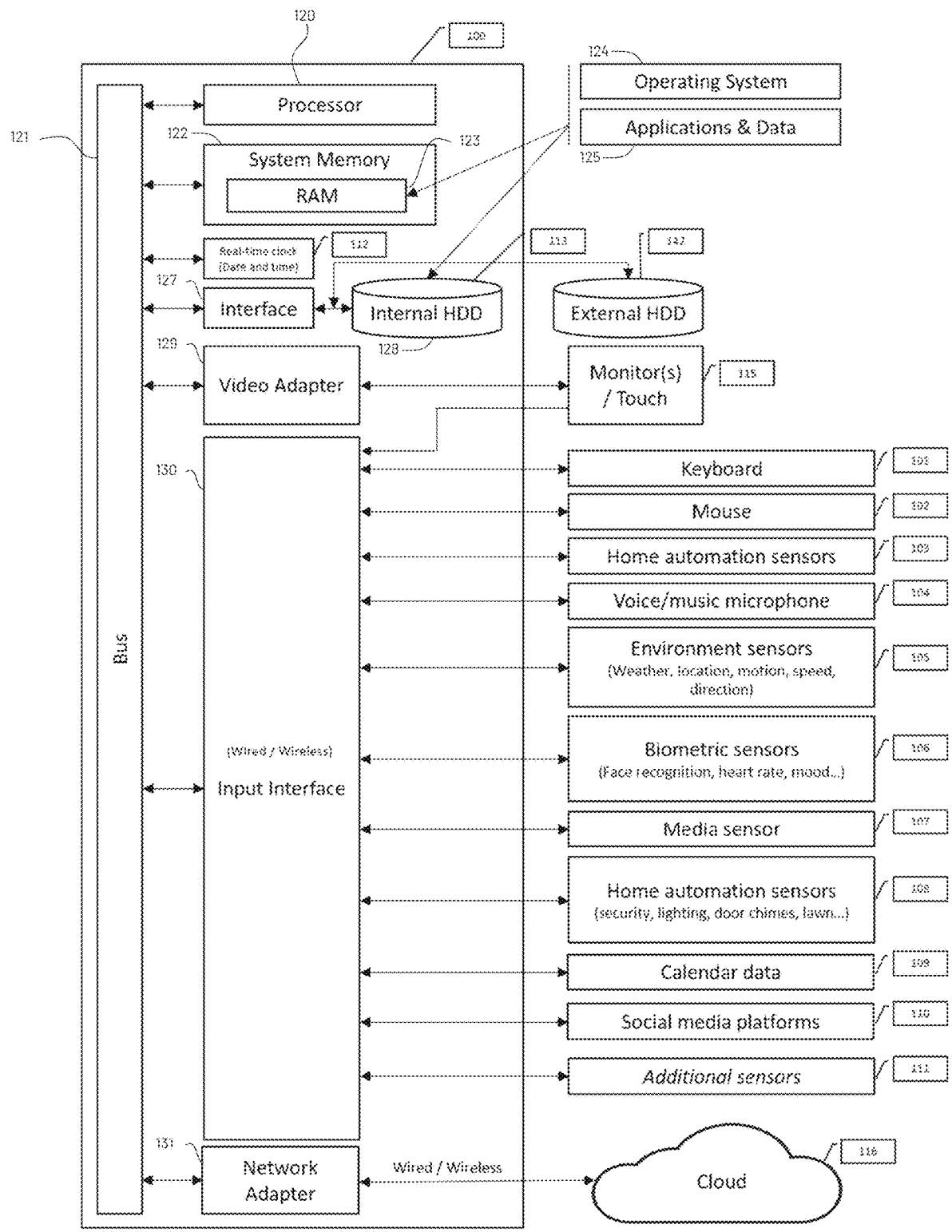
FIG. 1 is a block diagram illustrating a computing device with external hardware and cloud access that can dynamically alter media in slideshows in accordance with aspects of this disclosure.

Aspects of this disclosure relate to systems and techniques for improving the user experience of photos and videos. Advantageously, systems implementing the techniques disclosed herein can dramatically increase the joy and value of experiencing photo and video memories for users.

Market research has found that today most people find organizing and experiencing their favorite photos and videos to be extremely difficult. The sheer volume of media is difficult to manage and far too difficult to organize for viewing on digital picture frames, phones, and/or computers. The result is that personal and family photos and videos are often collected into large dormant libraries, not being enjoyed. For those few consumers who spend the time to organize their media for viewing on a digital photo frame or other device, the viewing experience becomes stale in short order given the difficulty and amount of time it takes to organize and propagate new and older media to a digital photo frames. For instance, photos taken over a year ago are still the same photos rotating on most people's frames today, without new favorite media taken on their phones over the last year being integrated into the slideshow. Particularly for digital photo frames, market research shows that the vast majority of people either look very infrequently at their frames, or they store their frames in a drawer.

In recent years there have been a myriad of products and development targeted at managing media and showing media in fun and interesting ways. Apple's iPhone organizes images based on facial recognition, location, and time to create "photo memories." Digital frame manufacturers have made it easy for friends and family to send newly captured photos to a digital frame.

There have been many other attempts at providing methods for selecting images based on various criteria for use in slideshows or other products. For example, one method for automatically selecting images is based on location, events, and "things found in media" amongst other criteria for use in slideshows and other products.

Another slideshow technique relates to a method for using photo metadata to find and view images.

Yet another technique for organizing media for slideshow relates to a method of automatically determining an overall image quality parameter by assessing various technical image quality attributes (e.g., sharpness, contrast, noise, and exposure) then show that media in a slideshow.

Still other techniques for providing slideshows relate to methods that include retrieving digital media content in real time and dividing the digital media content into groups each including similar digital media portions which can be viewed on digital various digital devices. These groups include: 1. A channel enabled via a smart TV may be pre-configured to only display current photos uploaded to a social media private section with easy to follow navigation options. 2. A flip-able digital photo album comprising paper thin electronic screens may be implemented as a photo feed from a single user. For example, a first page may illustrate a photo feed from a first user's social media account and a second page may illustrate a photo feed from a second user's social media account. 3. A cognitive picture frame may be enabled to filter out and display only photos determined to be acceptable by an owner of the cognitive picture frame. 4. Touching the person's photo in a photo frame may optionally enable a user to execute a phone call with the person.

However, each of the above products and techniques are not able solve the problem of how take groups of photos, assign a relative weight for comparing importance between groups, and show those groups of images based on contexts. For instance, these techniques are unable to organize media in more intuitively desirable ways, such as: i) show media captured in the last two months more often than media taken older than two months, ii) show only media of people invited to a dinner party, and/or iii) show media of a user and their significant other for two weeks prior to the significant other's birthday more often than all groups. The effect then is to show the most relevant media in the context of any given moment.

Previous attempts at organizing media for slideshows were limited by only providing techniques for selecting media into one or more groups for viewing and/or distributing that media. Such techniques do not specify a method for assigning importance between selected groups, nor show/hide groups with a weight based on context, for instance, what day it is today, what season it is, or who's over for dinner tonight. The effect of these prior attempts then is to see all photos for selected groups equally—for instance, photos taken today are shown with equal frequency as photos taken years and decades ago—which makes a slideshow viewing experience stale. Without the context of the date and ability to assign weights to media, while people may be excited to see recent photos taken in the last 3 months, they likely won't see those photos for a very long time unless shown exclusively.

Using these types of systems, a user can manually select desired photos (e.g., of the user and their significant other) to view for a birthday, however, that selection would need to be played in a slideshow exclusively vs other groups or merged into a new or within an existing group and shown at the same frequency as all other groups. With a collection of 100s or 1000s of photos, the selected images during those two weeks may not be included in a slideshow at a high enough rate to be viewed during a given timeframe (e.g., at a dinner party).

Aspects of this disclosure relate to systems and techniques that can solve at least some of the above indicated problems to improve the enjoyment and value of the user experience when using devices that can display slideshows of the user's media.

Overview of Media Management Systems

Media management systems that can be used to organize and display media in slideshows can be implemented in various different ways. In many embodiments, media management systems include a plurality of different modules which can be implemented in hardware and/or software. These modules may provide different functionalities which when operating together, manage media and select media when generating slideshows for viewing.

One aspect of a media management system includes metadata capture and management. This can involve the capture and storage of all metadata (which may be defined by EXIF and/or IPTC), either stored in a media file or a local database. Metadata capture and management may also involve the capture of facial recognition data in media, either stored in a media file or a local database. Metadata capture and management can also include the capture and conversion of GPS coordinates to regional areas (e.g., city/state/country), either stored in a media file or a local database. Metadata capture and management may further involve the capture of "things" in media—e.g., using the Google Vision service, either stored in a media file or a local database. As used herein, the "things" that can be identified in the captured media can include objects (e.g., people, the sun, a beach, etc.) and/or properties of objects or the environment (e.g., emotions associated with people in the media, weather conditions, the season, etc.). Metadata capture and management can also include the capture of custom metadata—e.g., event/trip names, either stored in a media file or a local database. Custom metadata may be user defined and/or automatically generated based on association detected from the captured media.

Another aspect of a media management includes media grouping. For example, media grouping can include defining a folder (e.g., stored on a computer and/or cloud storage) to be a "playlist" for a slideshow. For example, certain digital picture frames enable this capability. Media grouping can also involve creating custom groupings of media based on metadata, which may be performed on smartphone photos apps. Media grouping can also form groups of one or more of the following: all media of a person, all media at a specific location, all media of "things" in media (e.g., snow, hiking), all media based on a date (e.g., photos from today in history), and/or media from any month N years ago (e.g., 1/5/10 years ago).

Yet another aspect of media management includes slideshow viewing. Slideshow viewing can include showing a sequence of photos and videos in a slideshow. Slideshow viewing can further include shuffling multiple groups or playlists of media in a single slideshow, which is a common feature in digital picture frames. Slideshow viewing may also involve context-related changes to slideshow playback. Most digital picture frames enable a motion context (e.g., when someone enters the room, the frame will begin playing a slideshow). Some digital picture frames enable a hand gesture context (e.g., someone waves their hand to the right advancing the slideshow by one media file). It is also possible to use a keyboard, mouse, voice, and/or touchscreen to alter slideshow playback.

Slideshow viewing can further include various slideshow settings. These settings can include one or more of the following settings: duration of time to show media files for all enabled folders/playlists (e.g., there may be no existing art allowing a single folder, playlist, or in the context of the system, allowing a specific group, to have a duration of time specified for each group), media transition configuration, start/stop time per day for slideshow playback, show all enabled playlists or show last N media files, show captions on top of media being displayed, and/or photo enhancements (e.g., brightness, saturation, contrast, hue, etc.).

Slideshow viewing can further include compiled and/or dynamic slideshows. Many computer-based slideshow software applications require the output of a video for slideshows, making management of slideshows time-consuming. That said, many digital picture frames enable dynamic viewing of slideshows without any need for compiling into a video—e.g., if a user creates and enables a new folder to be shown on a frame, that change is made relatively quickly without the need to compile a video. Windows also enables slideshow viewing for files in a directory dynamically without the need to compile a video.

Brief Overview of the Disclosure

Aspects of this disclosure provide systems and techniques for applying weights to groups of media and listening to context triggers to alter media slideshows. In some embodiments, the system can include a weighted frequency engine configured to enable users to place more value on certain groups over other groups, a system that listens for hardware and software triggers that execute context group rules to alter and show selected media in a slideshow, and a system that utilizes group rules for how and when to show media files from a group.

Overview User Configurations and Slideshow Experiences

While aspects of this disclosure can be embodied in different manners, examples of the available user configurations and slideshow experiences that are possible will be provided. As described herein, the system can include a smart processing engine and a weighted frequency engine to enable different aspects. The user experiences can be enriched with additional configurations, described below.

Phone Installation and Default Slideshow Experience

Initially, the user can install an application associated with the system on their smartphone (e.g., iPhone or Android). The user can begin the default slideshow experience (no configuration required).

As a default, the system can include all hearted media from the user's phone in the default slideshow (configurable to include additional media). As another default, the system can include media taken in the last 60 days and show that media more often than all other media. Still another default relates to recent annual media, where the system includes media during this day and this week from 1-5 years ago and show that media more often than other media in slideshows. Another possible default relates to recent seasonal media, where the system includes media during "the current season in history" from 1-5 years ago and show that media more often than other media. For example, media from June-through September can be included during summer days. Still another example default relates to older annual media, where the system can include media during this day in history 5 years ago or older and show that media only somewhat more often than other media in slideshows.

Slideshow Experience with Additional Phone Configuration

The system can also allow users to further configure slideshows, for example, via the associated application in their phone.

One example configuration relates to people found in media. Using a smartphone's face recognition capabilities found in their Photo apps or using a computer software application, the user can add names of people, family and friends found in their media. The system can then automatically show "named" media more often than other media. Likewise, the system can show named media taken in the last 60 days and on anniversaries, over the last decade, and show that media much more often than any other media.

Another example relates to locations found in media. The user can configure their camera or phone to store GPS location data when capturing new media. The user can also grant the system access to their phone's location. The user will then see media taken at a current location more often than other media. Likewise, if there are named people in media taken at the current location, the system will show that media much more often than other media.

Slideshow Experience with Additional Configuration

In some embodiments, the system can be configured to find things (e.g., objects, actions, activities, etc.) in media. The system can then use the information of the discovered things to enable different experiences withing a slideshow.

As one example category of things that can be identified by the system are seasonal things. For instance, if a current date is during summer months, the system can identify objects or actions associated with summer in the stored media. For example, the system can identify objects or actions associated with summer such as the sun, the ocean, a baseball bat, hiking, a tennis racket, etc. The system can then show the media containing the objects or actions associated with summer and show that media exclusively or more often during summer months than objects or actions associated with winter (e.g., winter things) found in the stored media.

Another example category of things that can be identified by the system are time of day things. For instance, if it's morning, show media containing identified morning things more often than media with midday or evening things in the media. The same can occur for midday and evening times.

Yet another example category of identifiable things includes emotional things. In some embodiments, the system can, for instance, will find "happy things" in media—e.g., smile, joy, laugh, celebrations . . . —and shows that media more often than "unhappy things" found in media. Those skilled in the art will recognize that many other categories of objects, actions, activities, etc. can be identified by the system as relevant to the current environment of the user, and the system can find stored media that includes relevant objects, actions, activities, etc. to be included at a higher rate in a currently running slideshow.

In some embodiments, the system can further be granted access by a user to one or more social media networks. For example, the user can grant the system access to their social media account to enable the system to monitor friends and family birthdays, events, anniversaries, and more. The system can then use that information to show media related to the monitored things more often than other media. For instance, the system can be configured to show media of a family member or friend identified from the user's social media account more often than other photos for 2 weeks prior to the family member or friend's birthday, and much more often the day before and the day of their birthday.

In some embodiments, the system can also be granted access to a user's calendar, or software driving a timed list of actions, to monitor events, for instance, a dinner party with friends or people attending a business event. The system can then monitor the beginning of an event, pause all currently enabled metadata and context groups, find media with one or more people attending the event, and include that media in the slideshow. At the end of the event, the system can resume all paused metadata and context groups and resume the previous slideshow experience. In some embodiments, the system can use the timed list of actions as context triggers to change the weights of metadata and context groups, or enable/disable groups, then merge all media from all groups into the slideshow experience instead of pausing all metadata and context groups.

Slideshow Experience on Additional Devices

In some embodiments, the system can be configured to display the slideshow on a variety of different devices. For example, the user may want to view the slideshow experience on multiple devices, such as their Windows PC or Mac. To do so, the user can install an application related to the system on multiple devices and create a cloud account to store and sync configurations and media across multiple devices. The user can then log into their cloud account on multiple devices. The system will then automatically enable the current configuration on their first device, sync media, and enable the slideshow experiences across all devices on which the user has synced their configurations. It is not required to start using the system on a phone. The system could solely be installed on a PC or other digital device. If installing first on a PC or other digital device, the user could then create a cloud account to extend the system's configuration to other devices.

In some embodiments, the system can be configured to implement TV casting. For example, the user can configure their phone or PC to cast (or another similar technology such as Airplay) the system's slideshow onto their TV or other cast-capable display.

Slideshow Experience with Additional Hardware Configuration

In some embodiments, the system can be embodied within a digital media frame and/or can be included on separate hardware (e.g., a cloud service, a dedicated device, etc.) configured to control a digital media frame. The user can configure a supported digital media frame to use cloud services to display media on their frame. The user can grant the system access to either the digital media frame manufacturer's cloud or a cloud storage service supported by the manufacturer (e.g., Dropbox™, OneDrive™, Google Photos™ . . . ) to enable the system to control the slideshow experience on their frame.

In some embodiments, the system can also be configured to include and/or communicate with a facial recognition device. The user can configure a supported facial recognition device in a room (e.g., in the same room as the digital media frame and/or other display displaying the slideshow) to find the names of people who enter/leave a room. The system can then show media with one or more people in the room exclusively or more often compared to media without people in the room.

FIG. 1 is a block diagram illustrating a computing device 100 with external hardware and cloud access than can dynamically alter media in slideshows in accordance with aspects of this disclosure. As shown in FIG. 1, a computing device 100 can be operatively coupled to one or more of the following external hardware devices: an external hard disc drive (HDD) 142, one or more monitors 115 (which may be configured to receive touch input), a keyboard 101, a mouse 102, one or more home automation sensor(s) 103, a microphone 104, one or more environmental sensors 105, one or more biometric sensor(s) 106, one or more media sensors 107, one or more home automation sensor(s) 108, calendar data 109, one or more social media platform(s) 110, one or more additional sensor(s) 111, and/or one or more cloud computing resource(s) 116.

The computing device 100 can include a processor 120, a bus 121, system memory 122, a real-time clock 112, an interface 127, a video adapter 129, an input interface 130, and a network adapter 130. The components of the processor 120 can be connected via the bus 121 via which data can be communicated between the different components of the computing device 100. The system memory 122 (also referred to as memory hardware) can include random access memory (RAM) 123. The internal HDD 113 can store an operation system 124 as well as applications and data 125, each of which can be loaded into the RAM 123 for execution by the processor 120.

Example Systems and Techniques for Providing Improved Media Slideshows

As described herein, aspects of this disclosure provide systems and techniques that can dramatically increase the joy and value of viewing photo and video memories by showing media in the best-possible context for the users who are viewing that slideshow. Embodiments of this disclosure can achieve this goal by first assigning weights to groups of media then using contextual triggers to make the slideshow as relevant as possible to the users viewing the slideshow at any given time.

Figure 2:
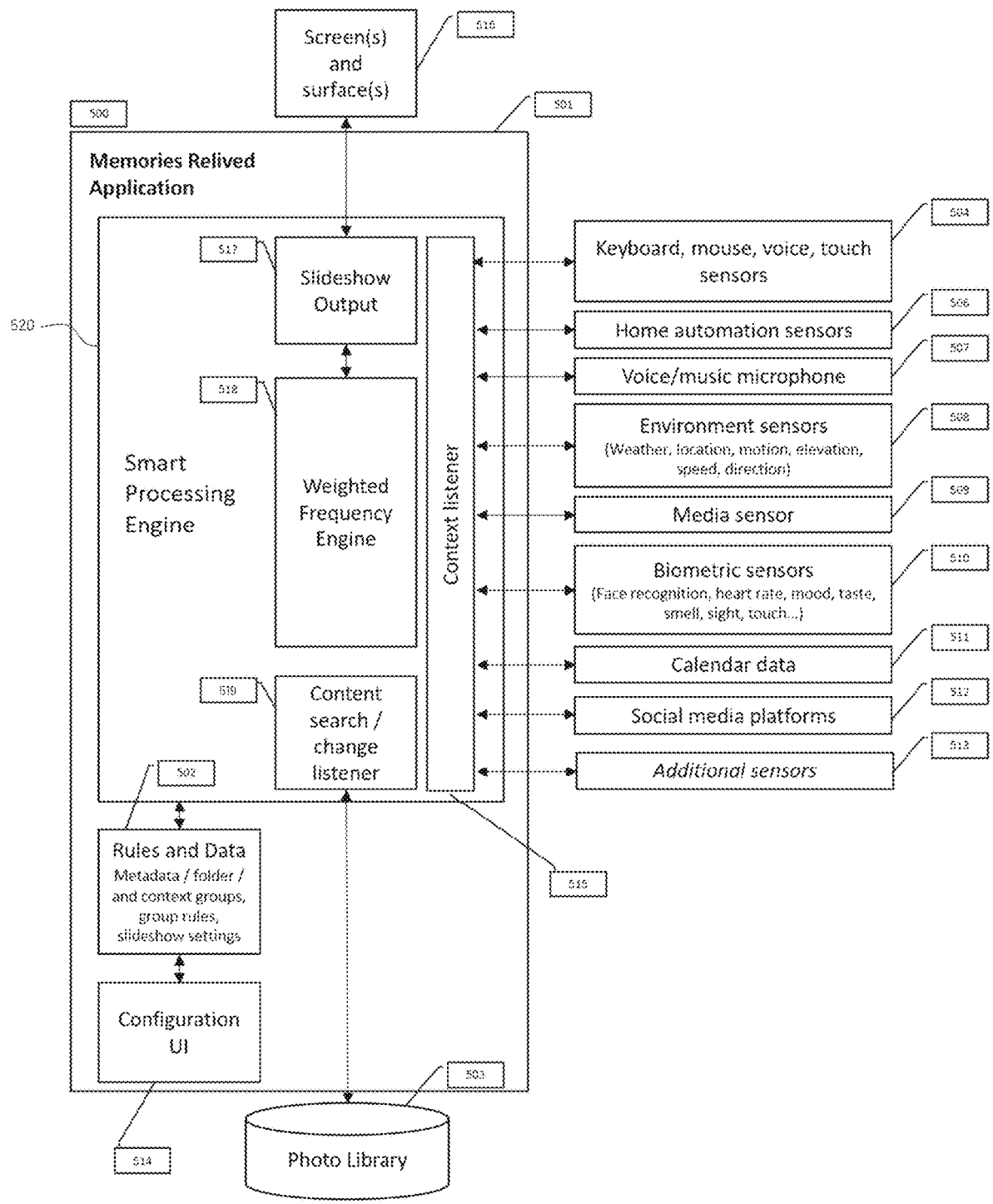
FIG. 2 is a block diagram illustrating the logical components of a system for preparing media slideshows in accordance with aspects of this disclosure.

FIG. 2 is a block diagram illustrating the logical components of a system 500 for preparing media slideshows in accordance with aspects of this disclosure.

The system 500 is configured to execute an application 501 which is configured to interact with one or more of the following external hardware devices: one or more screen(s) and/or surface(s) 516, one or more input sensors 504 (e.g., keyboard, mouse, voice sensor, and/or touch sensor), a microphone 507, one or more environmental sensors 508, one or more media sensors 509, one or more biometric sensor(s) 510, calendar data 511, one or more social media platform(s) 512, one or more additional sensor(s) 513, and/or a media library 503. The external hardware devices may be substantially similar to the external hardware devices of FIG. 1, and thus, the discussion of these devices in connection with FIG. 1 may also be applicable to the external hardware devices of FIG. 2.

As shown in FIG. 2, the application 501 can include a smart processing engine 520, a rules and data module 502, and a configuration user interface 514. The smart processing engine 520 can include a slideshow output module 517, a weighted frequency engine 518, a context search/change listener 519 (or simply search listener), and a context listener 515. The slideshow output module 517 can be configured to communicate with the screen(s) and/or surface(s) 516. The search listener 519 can be configured to communicate with the media library 503. The context listener 515 can be configured to communicate with one or more of the external hardware devices.

The smart processing engine 520 can be configured to perform various different functions, including: managing media metadata, managing metadata and folder groups and their rules, managing context groups and their rules, and monitor context triggers, managing slideshow settings, monitoring media being added or removed from a library as well as metadata updates to media, and/or outputting a slideshow to one or more screens.

While FIG. 2 provides one example embodiment of the system 500, aspects of this disclosure can be implemented in various different embodiments. For example FIG. 3 illustrates a system 500 similar to that of FIG. 2 without the inclusion of the weighted frequency engine 518.

Figure 3:
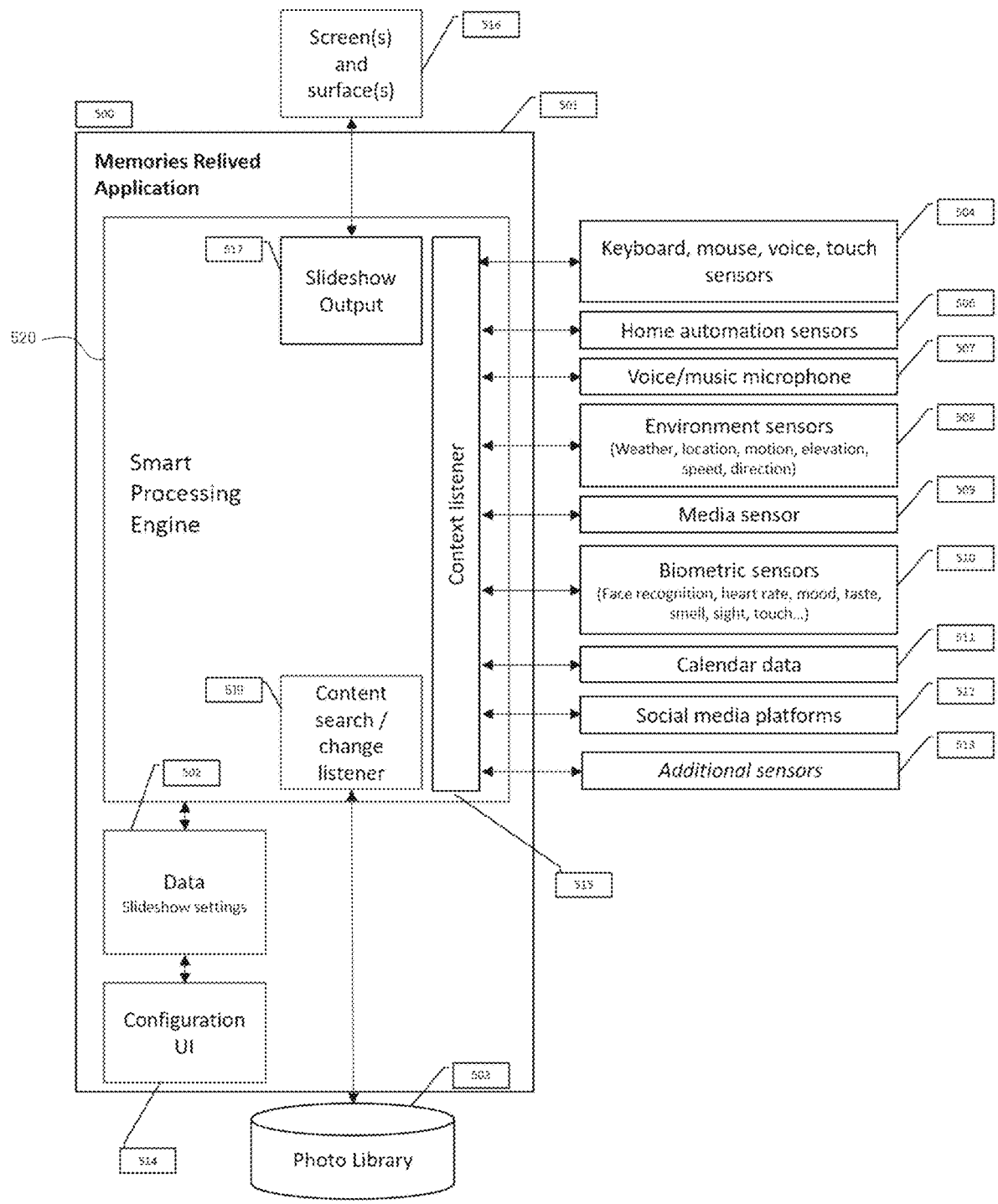
FIG. 3 illustrates a system similar to that of FIG. 2 without the inclusion of the weighted frequency engine.
Figure 4:
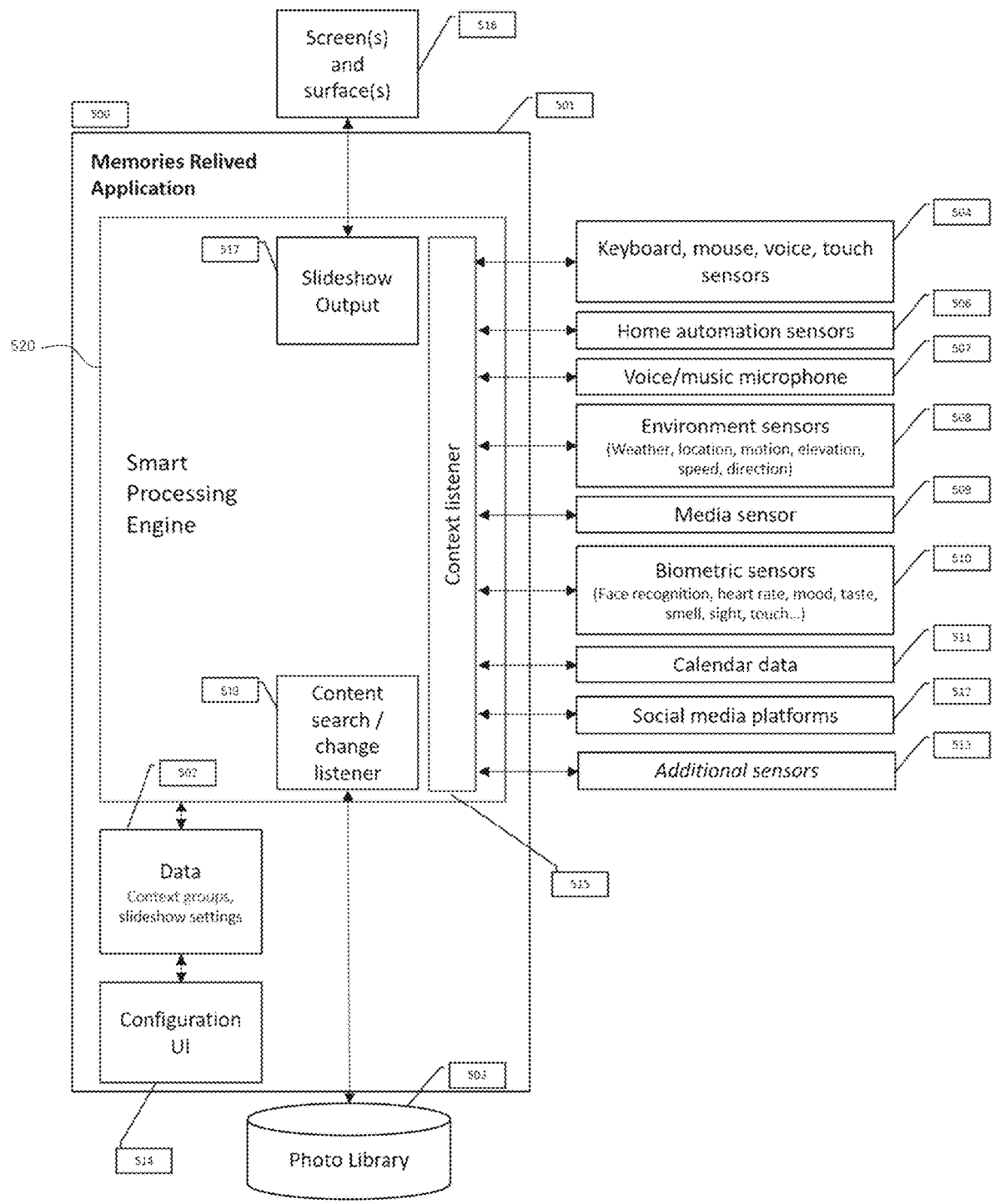
FIG. 4 illustrates an embodiment of a system similar to that of FIGS. 2 and 3 in which the rules and data module further stores context groups and a context listener.

FIG. 4 illustrates an embodiment of a system 500 similar to that of FIGS. 2 and 3 in which the rules and data module 502 further stores context groups. Additional description of the context groups are discussed below.

Figure 5:
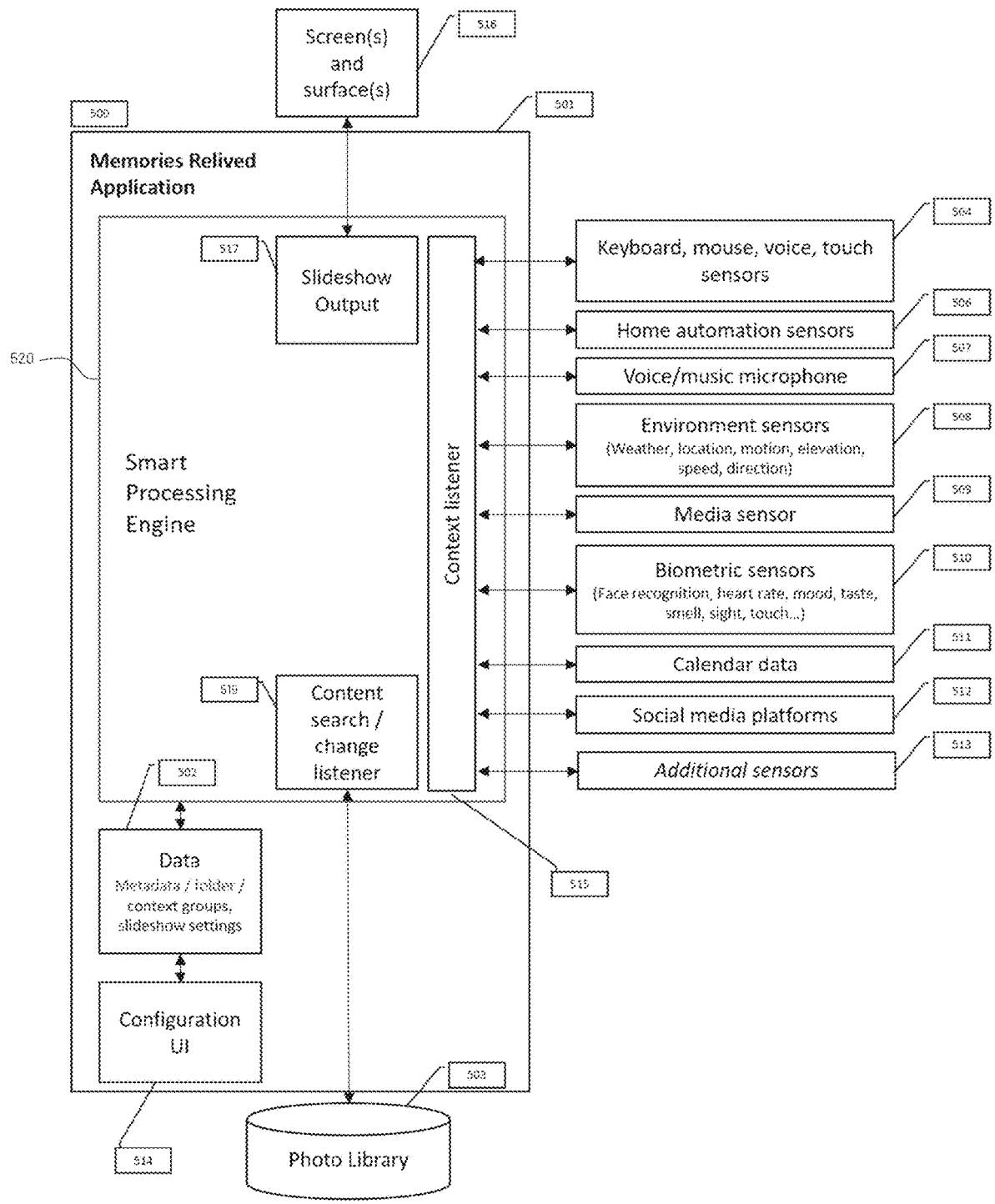
FIG. 5 illustrates an embodiment of a system in which the rules and data module further stores metadata groups and folder groups, together with the context groups.

FIG. 5 illustrates an embodiment of a system 500 in which the rules and data module 502 further stores metadata groups and folder groups, together with the context groups. Additional description of the metadata groups and folder groups are discussed below.

Figure 6:
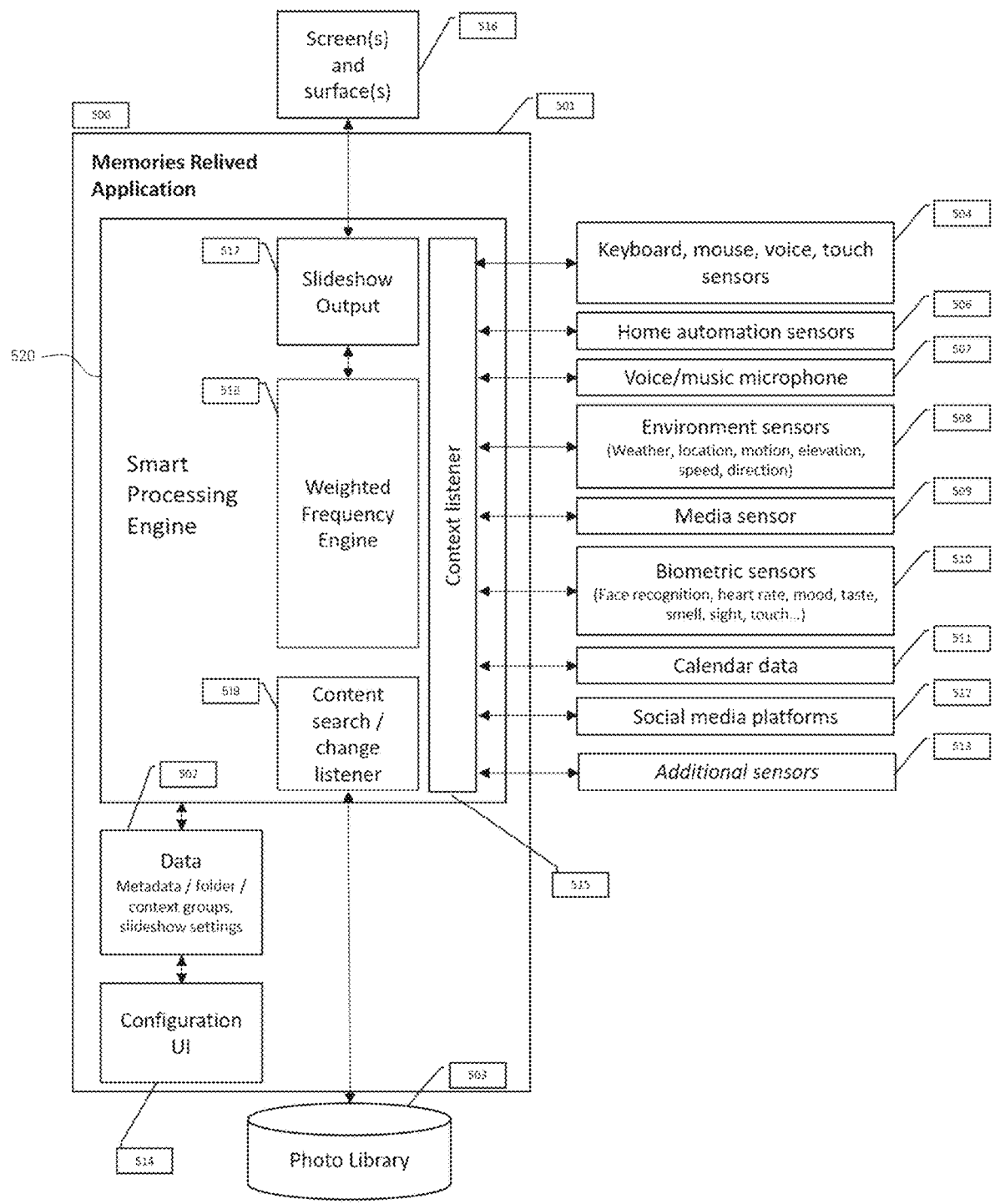
FIG. 6 illustrates an embodiment of a system in which the smart processing engine includes the weighted frequency engine.

FIG. 6 illustrates an embodiment of a system 500 in which the smart processing engine 520 includes the weighted frequency engine 518.

Figure 7:
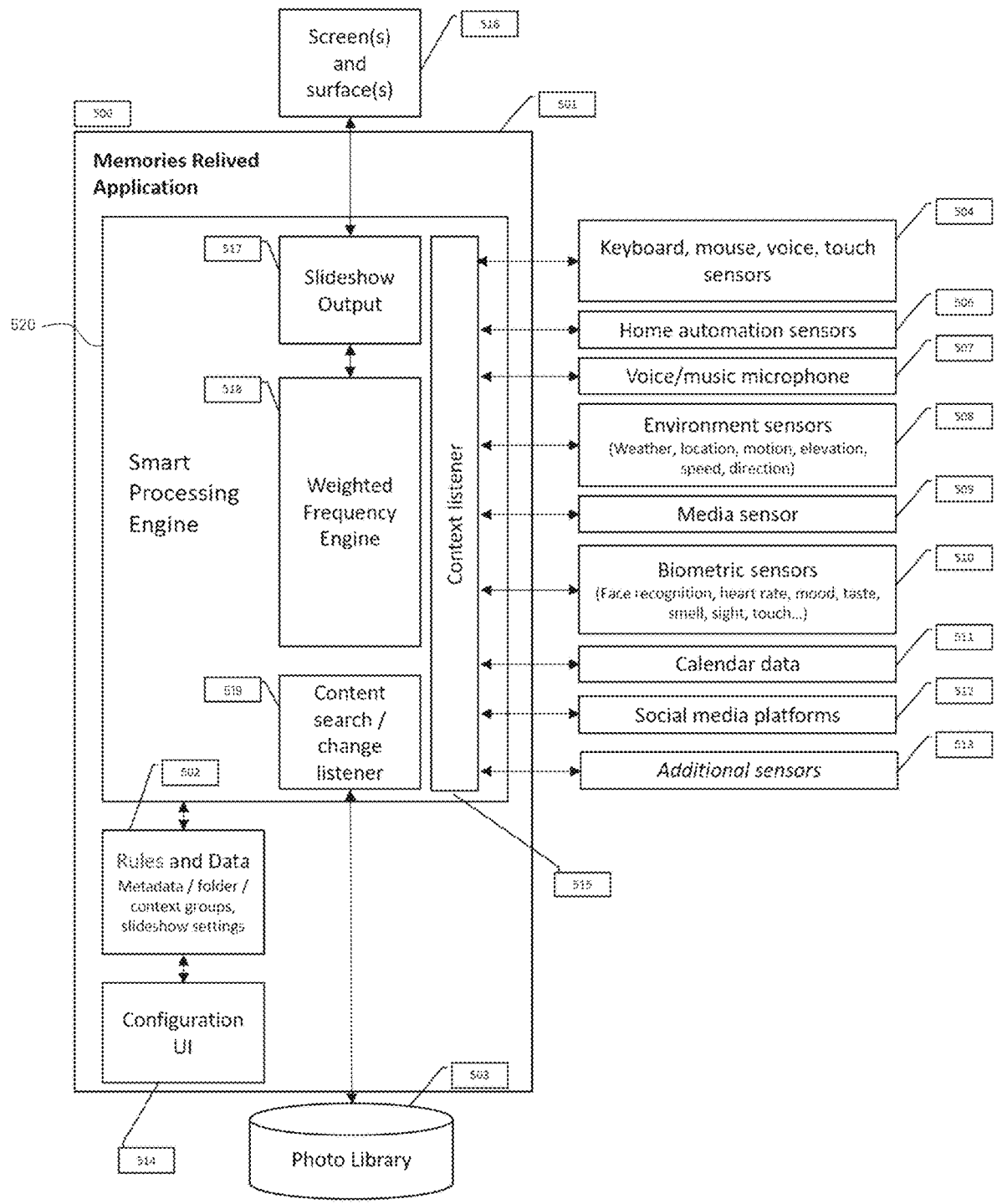
FIG. 7 illustrates an embodiment of a system in which the rules and data module further stores rules together with the metadata groups, the folder groups, and the context groups.

FIG. 7 illustrates an embodiment of a system 500 in which the rules and data module 502 further stores rules together with the metadata groups, the folder groups, and the context groups. Additional description of the rules are discussed below.

Figure 8:
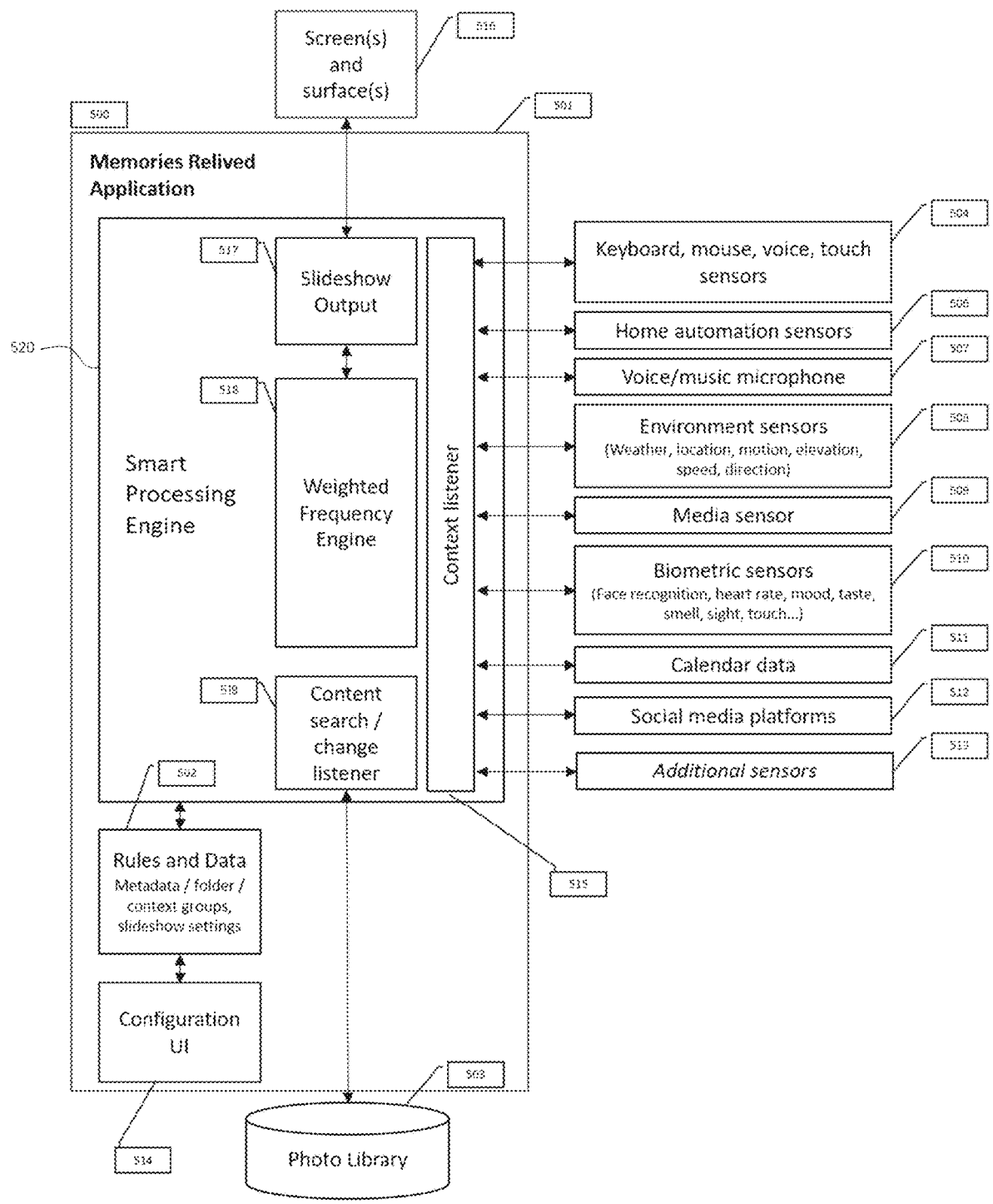
FIG. 8 illustrates an embodiment of a system in which the system can be configured to display slideshows on a plurality of different screens and/or surfaces.

FIG. 8 illustrates an embodiment of a system 500 in which the system 500 can be configured to display slideshows on a plurality of different screens and/or surfaces.

Figure 9A:
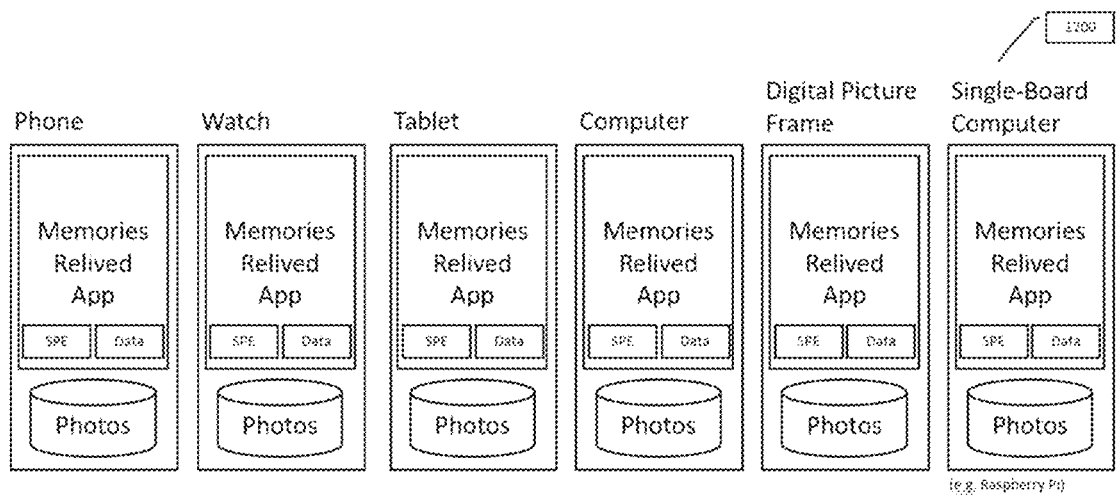
FIGS. 9A-9C are block diagrams illustrating example embodiments of applications related to the system running on multiple computing devices.
Figure 9B:
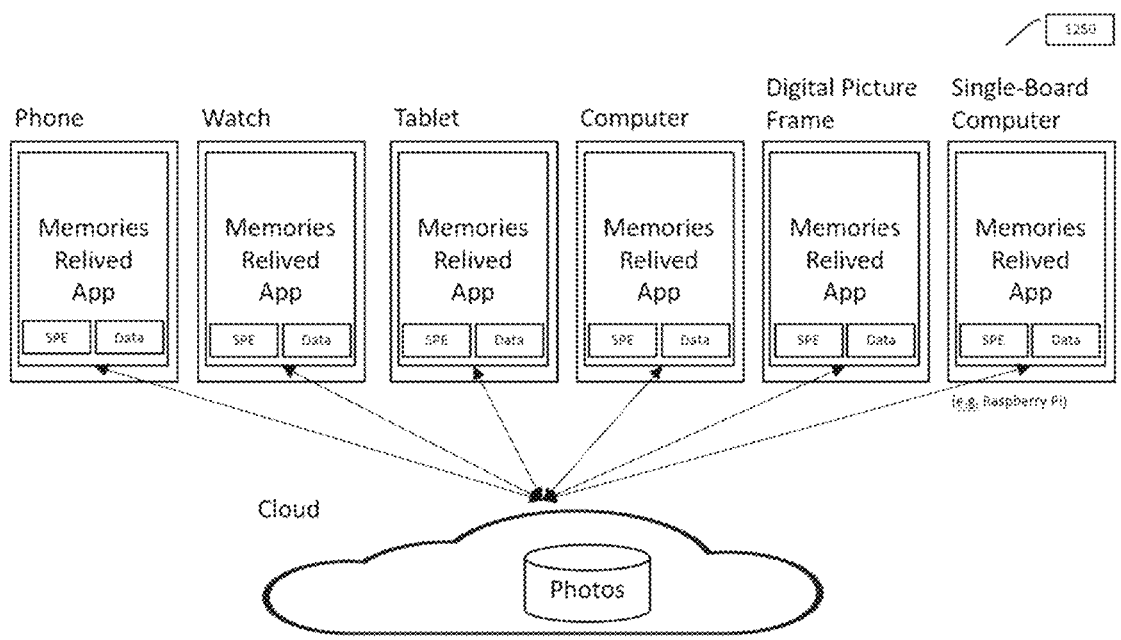
Figure 9C:
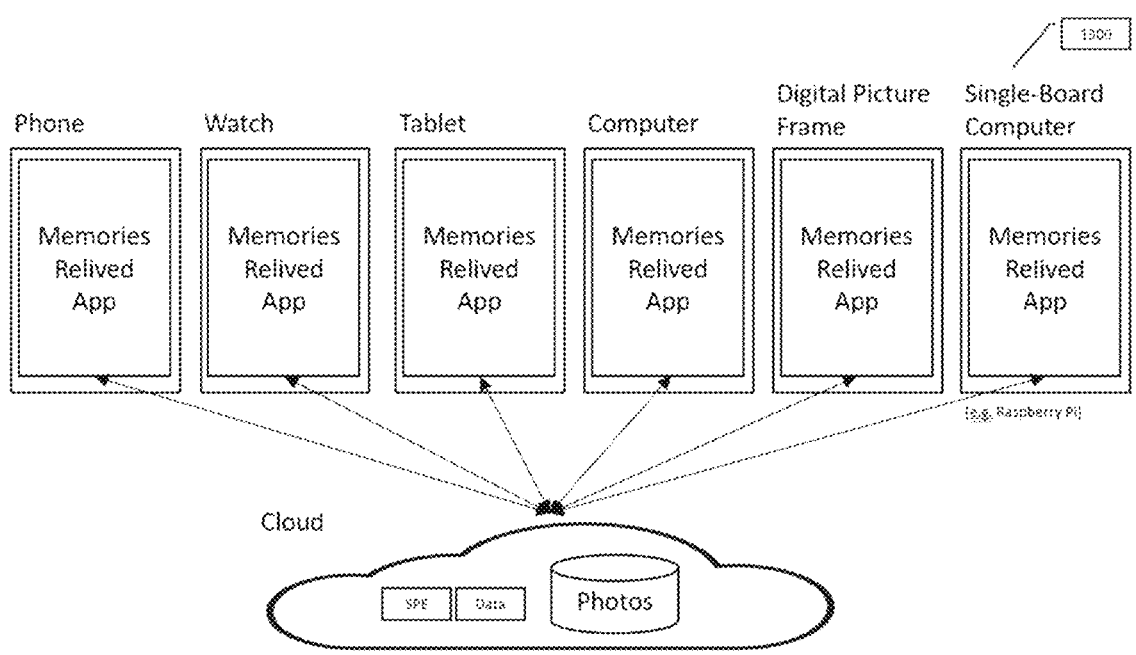

FIGS. 9A-9C are block diagrams illustrating example embodiments of applications related to the system 500 running on multiple computing devices. In particular, FIG. 9A illustrates the application 501 running on multiple computing devices. The smart processing engine 520, the rules and data module 502, and the media library 503 are running on each of the computing devices.

FIG. 9B illustrates the application 501 running on multiple computing devices which are configured to communicate with a cloud device. In this embodiment, the smart processing engine 520 and the rules and data module 502 are running on each of the computing devices while the media library 503 is stored on the cloud device.

FIG. 9C illustrates the application 501 running on multiple devices which are configured to communicate with a cloud device. In this embodiment, the smart processing engine 520, the rules and data module 502, and the media library 503 are stored on the cloud device.

Media Metadata

In detail, the smart processing engine 520 is configured to obtain the media metadata. In some embodiments, the smart processing engine 520 is configured to coordinate with other software to capture, manage, and store metadata in media.

The EXIF and IPTC organizations are extensive worldwide standards for specifying and storing metadata in media. When media is captured (e.g., with a digital SLR camera and/or a phone), the capturing device is configured to add metadata. The metadata can include data for the date/time taken, the make and/or model of the camera, the GPS coordinates if a user has the feature enabled, the file size, and/or literally hundreds or other metadata tags that may be related to the capture of the media. In certain embodiments, the smart processing engine 520 is configured to add or change metadata for media using one or more of these metadata standards. However, aspects of this disclosure are not limited thereto, and the modification of metadata can be performed using any standard without departing from this disclosure.

In addition to the metadata added at the time of capture, media post-processing applications can also add additional metadata. Examples of metadata post-processing software includes: using a phone photo application or a computer application to add a person's name to photos using facial recognition software (e.g., using the iPhone Photo app or Adobe Photoshop Elements that both enable this capability), using a phone photo application or a computer application to ratings, authors, tags, and/or hundreds of other metadata to a photo (e.g., add 1-5 stars or "heart" a photo), using a phone photo application or a computer application to add metadata for the "contents of a photo" (e.g., a photo may contain things like the sun, mountain, stroller, baseball, joy, sadness and other aspects of media). One example port-processing application is Google's Vision cloud service which enables adding "things" to photos. Aspects of this disclosure can use this or similar services to capture "things" in media and store that metadata in media files.

In some embodiments, the disclosed system and techniques can involve the use of computer or photo software to do metadata processing. For instance, using facial recognition software to add people's names to photos.

Because media often moves from device-to-device and between cloud systems—for instance, between a phone, computer editing software, processed through services, and/or cloud backup, plus more—it can be desirable to have media metadata stored in the media itself. This ensures all metadata is traveling with the media as the media moves across computing systems without the metadata being stripped or lost from the media as the media travels.

Certain digital devices may store the metadata for media in a local device database and not within the media file itself. For example, the iPhone does this for "hearted media" and people's names. Aspects of this disclosure can read the metadata from the local database and write the metadata in the media file itself. While phones and cameras can capture GPS coordinates for a photo (e.g., if enabled by a user), the phone and camera may not store the actual GPS city/state/country names in the media file or the local database. Accordingly, aspects of this disclosure can involve converting GPS coordinates stored in media into the regional area names (e.g., city/state/country names and store that metadata in the media. In some embodiments, the described techniques can interface with any other software to keep metadata in-sync between a local database and the media itself.

Aspects of this disclosure can further manage metadata per the above whether the media is the user's own library or a library and newly taken media from other people, family or friends.

Metadata Groups and Folder Groups

The smart processing engine 520 is further configured to manage metadata and folder groups. For example, in some embodiments, the smart processing engine 520 can create a metadata group based on a search of metadata in photos. The smart processing engine 520 can also be configured to create a folder group which is simply a folder containing media that a user wants to include in a slideshow.

In some embodiments, a metadata group can be a search of any simple or complex metadata search criteria regardless of where specific metadata is stored (e.g., in EXIF or IPTC fields) of a media file. The smart processing engine 520 can be configured to search across all metadata fields regardless of where metadata is stored.

Examples of metadata actual queries include: bob sue (bob "and" sue is implicit); bob OR sue; bob sue hawaii; john bob college; lisa john eliza NOT matt (e.g., don't include an ex-spouse); rating: >3 stars; john eliza sun beach; datetaken: Feb. 1, 2018 . . . . Feb. 29, 2020; taken: February; and taken: February 5.

In some embodiments, the system 500 enables simple and intuitive user interfaces to create these search queries. Metadata and folder groups can be named and stored in the smart processing engine 520. The metadata and folder groups can be enabled and disabled for viewing in a slideshow.

One value to the use of metadata and folder groups is that the groups can be configured to be dynamic. For example, the metadata and folder groups can be dynamic in the sense that when new and/or updated media containing metadata (e.g., the word "bob" is added to a field in a file) that matches the metadata search criteria defined in a metadata group rule, then that media file will automatically be added to all groups that contain that metadata in its metadata group rule. For instance, the smart processing engine 520 can add the added/updated media in the respective group for slideshow playback to all group rules that contain "bob". Similarly, if the word "bob" is removed from media, then the smart processing engine 520 can remove that media from all groups that have "bob" in the search criteria of the groups rule. The smart processing engine 520 can execute similar behavior works for folder groups. As media is added or removed from a folder group (a.k.a., a directory), the smart processing engine 520 will automatically add or remove that media from slideshows.

In certain embodiments, the smart processing engine 520 can be configured to process media search queries not just from the user's own library but also from one or more authorized libraries (e.g., from family and friends of the user).

Weighted Frequencies

One technological problem existing in the field of media processing for display in a slideshow is that such systems typically do not monitor the context of an environment to affect slideshows, and within the context of the moment, to assign an importance to different groups of media such that the media can be displayed such that media of higher value is seen more often than media of lower importance within the context of that moment. For example, aspects of this disclosure are able to solve the problem of how to design a system that can monitor contexts—including the date, time of day, current location, people in the room, current weather, upcoming birthdays and events, people over for dinner or a business event, and more—and within the context of any given moment assign importance to different groups of media to then deliver an experience where media of higher value is seen more often than media of lower importance.

Embodiments of the system 500 include a weighted frequency engine 518 configured to address at least a portion of the above-indicated problem. The weighted frequency engine 518 can be configured to assign importance to media and deliver a relevant experience based on the assigned importance. In some embodiments, the weighted frequency engine 518 can be configured to show media of higher value more often in a slideshow than media of lower value. For instance, in many situations, digital picture frame owners have been found to want to see recently taken favorite photos more often than photos from years ago. Thus, the weighted frequency engine 518 can be configured to select media of higher importance for recently taken favorite photos than photos from years ago.

The weighted frequency engine 518 can be configured to implement a variety of different functions in order to achieve improved weighting of media as well as a better user experience during slideshows. Examples of these functions are provided herein.

Example Weighted Frequency Algorithm

As used herein, a "weighted frequency" generally refers to a rule that the smart processing engine 520 can apply to one or more of metadata, folders, and/or context groups. In some embodiments, a weighted frequency can be defined by a number value within a range of numbers. For instance, in some embodiments, the weighted frequency engine 518 can use a default weighted frequency number range of 1-10. For many applications, the number ranges may be set once for the lifetime of using a product embodying this disclosure. The values given to a group can be any mathematical algorithm that produces a single number. For the purposes of this disclosure, a simple value range is described herein, for instance a value chosen from 1-10. Those skilled in the art will recognize that other value ranges can also be used without departing from aspects of this disclosure.

The weighted frequency engine 518 can then set a weighted frequency number value within the number range for one or more of a metadata, folder, and/or context group to determine how often to show media for that group compared to other groups. In some embodiments, the weighted frequency engine 518 may set the weighted frequency number value based on user input and/or based on a default value. For instance, if a first group has a weighted frequency value of 10 and a second group has a weighted frequency value of 1, then the weighted frequency engine 518 can include media from the first group 10× more often than the second group in a slideshow. The system 500 can be configured to receive input from users to set a different weighted frequency number range to have a lesser or greater effect on slideshows. For instance, if the number range is set to 1-100 (instead of 1-10) and a particular group has a weighted frequency value of 100, the effect is to see even more media for that particular group, 100×, vs other groups with a low weighted frequency of one. More on weighted frequency ranges below.

As a more detailed example, let's say there are two enabled groups according to embodiments of this disclosure:
1. Metadata group 1: "Hearted photos taken on a phone in the last 2 months" with a weighted frequency of 10. In one case there may be 20 media files in the result set.
2. Metadata group 2: "Hearted photos taken on a phone in all history" with a weighted frequency of 3. In this case, there may be 10 media files in the result set.

In this example, the weighted frequency engine 518 can be configured to select 10 media files from the first group and 3 media files from the second group and show all 13 media in a slideshow. The weighted frequency engine can be configured to define the collection of media to be shown based on a weighted frequency value as a sample session.

Once those 13 photos are all shown in the slideshow, the weighted frequency engine 518 can be configured to start a new sample session and choose a different 10 media files from group 1 and a different 3 media files from the second group. The weighted frequency engine 518 can be configured to keep track of which media files are shown in the slideshow from each group so that substantially all media can to be seen from a group before beginning to repeat media in that group result set.

In other embodiments, the weighted frequency engine 518 can be configured to select media at different rates from different groups without using a weighted frequency range and/or weighted frequency values. For example, the weighted frequency engine 518 can be configured to assign weights to different groups of media using other techniques (e.g., a weight between 0 and 1, a weighting ratio between different groups, etc.). Thus, those skilled in the art will understand that aspects of this disclosure can also include other techniques for weighting groups of media.

Example Viewing Experience when a Group's Media Result Set is Less than the Group's Weighted Frequency In some circumstances, the result set for a group may be less than the weighted frequency. In order to address this situation, the smart processing engine 520 can be configured to restart the group's metadata search query and continue selecting from the new result set until the weighted frequency has been met. In one example, group 1 may have only 5 media files in its result set based on a metadata search. Group 1 may also have a weighted frequency of 10. In this case, the smart processing engine 520 can be configured to use all 5 media files, "restart" the query, and choose another 5 media files to get to the value 10 set in the weighted frequency. The effect on the viewing experience would be to see media files from that group twice within one sample session. If group 1 had only 1 media file in its result set, then that 1 media file would be shown 10 times during a single sample session.

Viewing Experience of Media being Added, Removed, or Updated from a Group in Real-Time Another situation that may occur is that media can be added, removed, and/or updated from a media group while a slideshow is being created and/or displayed. To handle this situation, the smart processing engine 520 can be configured to run group queries at a predetermined frequency (e.g., every second) to consider new, deleted, and/or updated media while delivering a slideshow. For instance, if a newly taken photo on a phone is hearted and moved to a media library where the system 500 is processing media, the smart processing engine 520 will add that media in real-time to all groups that have "hearted metadata" in its group rules, even while the slideshow is running. Using the two example groups described above that both contain "hearts" in its rules, a newly taken photo that's hearted would be added to both groups—the $21^{st}$ media file in group 1 and 11th media file in group 2—and immediately become available for new sample sessions.

Viewing Experience Once all Media for a Group has been Exhausted within a Sample Session As mentioned above, once all media from a group has been shown, the smart processing engine 520 can be configured to "re-run" the search query defined in the group and again choose another X photos from that group, based on the weighted frequency of the group. In one example, the result set for metadata group 1 described above is 20 media files. Because group 1 has a weighted frequency of 10, all media will have been shown in the slideshow after two sample sessions—10 files in sample session one and the next 10 files in the second session. The smart processing engine 520 at that point will drop knowledge of all media files being shown for that group and begin re-selecting media files from that group with all of the media from the result set available for selecting. In the example above for group 1, the smart processing engine 520 can begin re-selecting from all media files in that group in the third sample session.

In another example, once a newly taken photo is added to group 1, that media file became the $21^{st}$ media file in the result set, immediately available for selection in a sample session. In this example, group 1 may have a weighted frequency of 10. During sample sessions 1 and 2, a total of 20 of the 21 available media files were selected for viewing. Now for the $3^{rd}$ sample session, group 1 has just 1 media file left to show but has 9 more slots to fill to get to the 10 weighted frequency value for the sample session. In this case, after that last 1 media file was selected, the smart processing engine 520 can then be configured to drop all knowledge of selected/shown media for that group and restart the search process again now with all 21 media files available for selection. In this case, the smart processing engine 520 can choose another 9 media files in the $3^{rd}$ sample session from the full set of 21 media files to select from, which leaves 12 media files for the next 4th sample session. Then in the 4th sample session, the smart processing engine 520 is configured to choose from those 12 media files left in group 1. In sample session 5, the smart processing engine 520 reduces that set by another 10 media files to 2 media files left. In sample session 6, the smart processing engine 520 then selects those 2 files and re-starts the search selection process again with all 21 files again available to fulfill the additional 8 media files needed to meet the weighted frequency value of 10.

Viewing Experience Impact with Increasing the Weighted Frequency Range

As described above, aspects of this disclosure relate to a system 500 configured to by default set a weighted frequency range between 1 and 10. For users who want to see even more of their favorite media files vs other media, the system 500 is configured to allow for a different weighted frequency engine 518 number range to be set. For instance, if a user wanted to see their favorite media files dramatically more often than lesser valued media, they could define a range from 1 to 1000 (or more) and set the weighted frequency for a "favorite" group to 1000. In this example, because most group result sets will likely be far less than 1000, more likely in tens or hundreds of media files, the entire query result set for a group with a weighted frequency value of 1000 will be re-selected multiple times to meet the 1000 weighted frequency value within a single sample session, repeating those media files many times within a sample session.

How the Smart Processing Engine Selects and Shows Media from a Group in a Sample Session In order to keep the slideshow viewing experience as fresh, valuable and exciting as possible, the smart processing engine 520 can be configured to allow groups to control how media is selected from each group in a sample session, as well as how the selected media for a group is shown in a slideshow.

The system 500 can be configured to provide two order selection settings for a group that can be used for both the selection and viewing of media. The two order settings can include: 1) shuffle, or 2) an alpha-numeric sorting of a media files' metadata fields (e.g., an ascending sort of the "tags" field). The system 500 can apply the same two settings to an umbrella order playback setting that applies across all enabled groups. For instance, either show all media across all groups in a sample session shuffled or show based on a sort order of a specific metadata field.

For instance, the system 500 can be configured to define the two order settings for the above two enabled groups:
1. Metadata group 1:
   a. Selection: Shuffle
   b. Viewing: Shuffle
2. Metadata group 2:
   a. Selection: Alpha-numeric for the filename field, ascending
   b. Viewing: Alpha-numeric for the filename field, ascending The system 500 can set the umbrella order playback setting to shuffle.

For the first sample session, the smart processing engine 520 can be configured to randomly select 10 media files from group 1 and 3 media files based on the ascending sort of the "tags" field for group 2. The smart processing engine 520 can then shuffle both result sets.

Monitoring New Media and Metadata Updates

In some embodiments, the smart processing engine 520 is configured to monitor substantially all media changes including media being added and removed from a library, plus another person, family or friends authorized library, including metadata updates made to media. In response to detecting any of these changes, the smart processing engine 520 can automatically change slideshow viewing in real-time. For instance, in one example there may be a metadata group with a rule defined with "show hearted media, created over the last 2 months." A user can create a new photo on a phone, and "heart" the photo." In this case, an application on the phone will automatically copy that photo to cloud storage, a location that the smart processing engine 520 monitors for new, removed, and/or updated media files. In this example, the smart processing engine 520 can be configured to detect the newly taken media file on cloud storage, processes the media file's metadata, find the "heart" metadata, and then automatically include that photo in real-time into the "show hearted media, created over the last 2 months" metadata group. Similarly, when media has metadata added, changed, and/or removed, the smart processing engine 520 is configured to automatically and in real-time add or remove media in all groups based on whether the updated metadata still matches the search criteria defined by a group. For instance, if a user adds "bob" to a photo, then that photo will automatically in real-time be added to all groups that have "bob" in its rules' metadata search criteria.

Using Contexts to Alter Slideshow Viewing

Another aspect of this disclosure is to provide a fresh, exciting and/or valuable media viewing experience. In some embodiments, this can be accomplished by monitoring context. As used herein, context generally refers to measurable aspects of the environment in which the slideshow is currently being displayed, including but not limited to: the current time, the date, the season, the people present in the same room as a digital media device displaying the slideshow, aspects of the user's social media, activities being engaged in by people near the digital media device, weather, biometrics, etc. Traditionally, digital media device does not detect this type of context regarding the environment of the digital media frame, and thus, cannot update slideshows based on changes in the context.

According to aspects of this disclosure, the system can provide a fresh, valuable and exciting media viewing experience by monitoring the context of the system 500. For example, the system 500 can be configured to continually monitor contextual triggers, and execute on rules to alter slideshow viewing in response to one or more of the contextual triggers being triggered.

In certain embodiments, the smart processing engine 520 can achieve this by "listening" for software and hardware context triggers. Based on a trigger, the smart processing engine 520 can be configured to show or not show media based on a context group rule 515 associated with the context trigger. Together, a context rule and the associated context trigger can be referred to as a context group.

For instance, an example "date and time" trigger can be configured to trigger when midnight strikes. In response to the triggered "date and time" trigger, the smart processing engine 520 can implement a context rule to find all media "on this day in history" and show that media in a slideshow, until midnight the next day.

In some implementations, a context group and the associated context rule may be akin to an if-then construct that tells the smart processing engine 520 if a context trigger is triggered then apply the context rule. For instance, the system 500 can include a date context group that shows all media on each day from that day in history. The smart processing engine 520 can then detect "midnight" from a day/time sensor then finds media and shows for that day in history much more often than media not on this day in history. The smart processing engine 520 can then implement the associated context group rule to pause or enable/disable other enabled metadata and folder groups, play the media in its group for a duration of time, change slideshow playback, or take many other actions. For instance, at 8:00 am (a date/time trigger), the smart processing engine 520 can show all media "on this day" exclusively on a digital picture frame for one hour, pausing all other enabled groups during that hour.

Additional content group rule examples include:
- If a friend's birthday is 14 days away, find all media where my bestie and I are in the photo and shuffle with a weighted frequency that media with other enabled groups in a slideshow for the next 14 days.
- When a face recognition device detects someone has entered a room, the system 500 can use software to detect the face, find the person's name, then find all media of that person and show that media exclusively on a digital picture frame while that person is in the room.

The system 500 can be configured to implement context groups such that the context groups behave similar to metadata and folder groups. For example, the system 500 can enabled or disabled context groups for viewing in a slideshow. A context group can show media exclusively in a slideshow or shuffled with all other enabled metadata and folder groups each with their own weighted frequency.

In some embodiments, the system 500 may include common rules 502 that are available to all context group types.
- Custom metadata search-Find media related to a custom metadata search-during the summer months, show summer-related media
- Manage enabling/disabling other groups-Enable/disable saved metadata or folder groups
- Play/pause/revert-Pause all enabled groups in a slideshow for a time period then revert back to prior enabled groups
- Start/stop the showing of media based on a date/time—e.g., At midnight (the trigger), find all media on this day and begin showing in a slideshow at 8:00 am each day and end at midnight each day
- Show media at a specific time period prior to and after a date/time—e.g., For a friend's upcoming birthday (which can be a social media trigger), find media of that friend and I and begin showing that media on a digital picture frame 14 days prior to their birthday and end at midnight of their birthday (which combines this rule with the prior rule)· Show media for a time duration—e.g., A person in a room asks the system "show all media of bob sue in college for one hour" (which uses a voice input trigger to dynamically define a duration)
- Order of media playback—Either shuffle or use an ordered list based on an EXIF/IPTC field—e.g., filename, date taken, etc.
- Change slideshow settings—Pause, stop, advance, backup a slideshow—e.g., When a phone's accelerometer detects a swiping right motion (a trigger), advance the slideshow to the next media Group Rules In some embodiments, the system 500 can be configured with a context trigger that can also define the context trigger's own custom rules based on the inherent characteristics of the context. For instance, a security camera sensor (a context trigger) has a "motion detected" trigger. If the "motion" trigger is detected after dusk, for instance, a rule inherent to the security context could be to pause a slideshow on a digital picture frame, and then switch to a live video stream from the security camera.

The system 500 can also include well-defined context group types in the ecosystem. Examples of these context groups include: date and time, environmental, biometric, calendars, social media, media contexts, home automation, and/or states.

In some embodiments, the system 500 can have an architecture that is pluggable so that developers can integrate additional types of hardware or software context triggers.

More in-depth description examples of well-defined context types and examples of rules defined for context groups can include the following:

Date and time contexts—Date and time context triggers relate to a specific date and/or time:
  Most recently taken media—Show all media taken with a phone over the last two months. The effect of the rule is to have a rolling two months of the most recently-taken media.
  On this day—Show all media on this day in history
  During this month—Show all media during this month in history using a date range
  During this season—Show all media during this season in history using a date range
  Major events—Show media on big anniversaries—marriage, graduations, retirement, etc.
  In addition to other date/time—based context triggers and rules.
Environment contexts—Environment context triggers relate to the environment that is present while viewing a slideshow:
  Location—A GPS sensor enables media to be shown/not shown based on a location—e.g., show all Hawaii media while the user is in Hawaii
  Speed—A speed sensor enables media to be shown/not shown based on the speed determined by the sensor—e.g., if traveling at 500 mph, show all trip-related media (media with a GPS coordinate greater than 100 miles from the user's home)
  Elevation—An elevation sensor enables media to be shown/not shown based on an elevation—e.g., if above 2000' and not at home, show all mountain or hiking related media
  Weather sensor—A weather sensor detects temperature, clouds, wind, snow, brightness, sunrise, sunset, and/or sun, for instance, then enables media to be shown/not shown with "things" in media—e.g., show media with sunny "things" on rainy days
  Direction—A direction sensor enables media to be shown/not shown based on the direction determined by a sensor
  In addition to other environment related context triggers and rules.
Biometric contexts—Biometric sensor triggers relate to a person's personal state—for instance, heart rate, motion/moving, mood, or gestures:
  Motion—A motion sensor enables media to be shown/not shown based on the presence or lack of motion in a space
  Face recognition—A face recognition sensor detects a person entering a room, then looks up that person's name, then shows/doesn't show media of that person
  Gesture—A gesture sensor detects hand movement and can then control slideshow playback (e.g., advance one media file) or other management task
  Mood—A mood sensor detects happiness, sadness, anger, or other emotion then shows/doesn't show media based on that mood
  Voice, keyboard, mouse, monitor touchscreen—Metadata captured from one of these inputs (e.g., typed or spoken words) then enables media to be shown/not shown based on the metadata entered—e.g., "show all media related to bob, sue, and Hawaii exclusively for 10 minutes"
  Taste—A taste sensor detects a specific taste then shows/doesn't show media based on that taste
  Sight—A sight sensor detects a specific object/thing seen by a person then shows/doesn't show media based on sight detection
  Smell—A smell sensor detects a specific smell then shows/doesn't show media based on that smell
  Touch—A touch sensor detects a specific object/thing then shows/doesn't show media based on that detection
  In addition to other biometric related context triggers and rules
Calendar contexts—Calendar context triggers use the date, time, duration, attendees, and other data in a stored calendar event to effect viewing of media in a slideshow:
  Event title—An event with a start/end date, for instance monitor an event with "Hawaii" in its title, then show media from past Hawaii trips for 30 days prior to that next trip
  Event "body" or description—A "thing" described in a calendar events body or description can show/not show media for days prior to the event—for instance, if a "kids soccer game" is next weekend, show all media from past soccer events for one week prior to the next event
  People—Attendees for an event—for instance for a dinner party event between "you, your spouse and 3 besties"—is a trigger to show media of the people attending the event exclusively on a digital screen during the time period of the event
  Birthdays—A friend or family members birthday event is a trigger to show media with that person for a duration of days/time prior to the birthday
  Events—A special event—e.g., a graduation, retirement, or wedding anniversary—are triggers to show/not show media with metadata containing these terms for 30 days prior to the scheduled event—e.g., show media related to our wedding anniversary for 30 days prior and 2 days after the anniversary
  In addition to other calendar related context triggers and rules
Social media contexts—Social media context triggers relate to personalized information presented to users on most typical social media platforms, for instance:
  Birthdays—A Facebook stored birthday, for instance, is a trigger to show media for a person two weeks before that person's birthday
  Events—A Facebook stored event, for instance, is a trigger to show media related to that event for two weeks before the event
  Trending topics—A trending topic, for instance, is a trigger to show media related to that topic while the topic is trending
  In addition to other social media related context triggers and rules
Media contexts—Media context triggers relate to entertainment related contexts, for instance:
  TV—A "what's on TV" sensor detects that tennis is currently being viewed, for instance, then becomes a trigger to show tennis-related media (e.g., from past trips to tennis events) exclusively on a digital picture frame while watching that event Music—A "what song is currently playing" sensor detects the genre and beats-per-minute (BPM) for a currently playing song, for instance, then becomes a trigger to show media related to that genre or BPM Gaming—A "what game is being played" sensor is a trigger to show/not show media related to a specific game In addition to other media related context triggers and rules Home automation contexts—Home automation context triggers relate to hardware sensors that provide home security, lighting, watering and other automation:

Security cameras and window/door sensors—A security camera detects motion or a window/door that is open that becomes a trigger to shows media relevant to that trigger—for instance, show a warning image on a digital picture frame if a window or door is open at bedtime Lighting—Lighting in a room becomes a trigger to show/not show media based on whether lights are on, off, or at different levels—e.g., If lighting is dimmed very low in a room, only show "dark" related media In addition to other home automation-related context triggers and rules State context—Triggers based on a hardware or software state can enable media to be shown/not shown:

Hardware: A phone accelerometer sensor detects a phone being tilted to the right which can then advance a slideshow to the next media Software: A home has a lighting automation wall button that says "party mode" which when turned on then shows media relevant to party participants In addition to other hardware or software state-related context triggers and rules The system 500 can be configured to process context groups not just from the user's own library but also from an authorized library from family and friends.

Slideshow Settings

The system 500 can be configured to allow users to define slideshow settings in the smart processing engine 520. These settings can be stored in the rules and data module 502. In some embodiments, the settings can affect the entire slideshow experience across all groups. Some example types of slideshow settings that can be managed by users include:

Playback speed—Set media playback duration to a time period—e.g., 5, 10, 30, 60 seconds or more Transitions—Enable one or more types of transition types Pan and zoom—Enables or disables pan and zoom within media is being shown Shuffle vs ordered playback—Enable a metadata, folder, or context group or context to show media in a shuffled or ordered playback based on EXIF and IPTC fields—e.g., file name, date created Volume—Whether to enable audio to be played during video playback Screen brightness, saturation, contrast, hue and similar settings—Controls to enable/disable or change a range of these settings Collage mode—Whether to enable, disable or a set a time period to show a collage of media including the format of the collage—e.g., number and size of media in the collage Slideshow state—Whether to start, stop, pause, advance, backup media in a slideshow Group Rules As described herein, the group rules can instruct the smart processing engine 520 when and how to show media in a slideshow and/or can be used to affect a running slideshow. Rules can be applied to any combination of group types—metadata, folder, and/or context groups. Below are examples of the rules that can be applied in certain embodiments:

Enable/disable a group—Enabled metadata and folder groups will have their media shown in a slideshow. Enabled context groups allow the Smart Processing Engine (SPE) to monitor context triggers and execute its rules. Disabled groups are then removing their media from a slideshow and the SPE will stop monitoring the group's rules.

Set a duration of time to show media for a group—Most products on the market have a single duration setting for showing media in slideshow that applies to all enabled content/playlists. In embodiments of this disclosure, some media/groups have more value to users than other media/groups, thus the system 500 can be configured to allow for media of higher value to be shown for a longer duration of time vs other groups.

Start/stop a group based at a date and/or time—Begin showing a selection of media on a specific date and/or time—e.g., At midnight, find all media with today's date and show in a slideshow until midnight tomorrow night. This can occur when a metadata or folder gets enabled or when a trigger occurs for a context group.

Set time duration for showing media from a group—Begin showing a selection of media for a time period—e.g., when a person enters the room, find media the person is in, and show for one hour. This can occur when a metadata or folder gets enabled or when a trigger occurs for a context group.

Time range of day—Begin showing a selection of media during a specific time period of the day—e.g., from 8:00 am-9:00 am. This can occur when a metadata or folder gets enabled or when a trigger occurs for a context group.

State changes (context group specific)—When a context trigger is detected, begin showing a selection of media until another trigger is detected—e.g., when a person enters the room, find media they're included in, then show until they leave the room.

Change slideshow playback (context group specific)–A rule for a context trigger can be to effect slideshow playback, for instance, change the time duration for media playback, speed, transitions, collage mode, and other settings. For instance, if a "mellow" mood context input is detected, a context group rule can be defined to slow playback (show media for 10× the set duration) and make "mellow" media transitions to match the persons emotion.

Weighted frequency—As described herein, one of the desirable aspects of the system 500 is a weighted frequency type of rule. The weighted frequency engine 518 can use a weighted frequency value to determine how frequently to show media for a group. A low weighted frequency value for a group can be interpreted to show media less frequently than media from a group with a high weighted frequency value. In practical use, a weighted frequency shows more of the most important media in a slideshow based on the interests of viewers. For instance, based on research, families want to see more hearted photos in a slideshow taken on their phones in the last two months vs photos taken longer than two months ago. In some embodiments, the system 500 can set a high default weighted frequency value for upcoming birthday's, big annual events (e.g., an anniversary), and media "on this day in history." The system 500 can further be configured to set a low default weighted frequency value by default for triggers related to mood, home automation lighting, and weather, for instance.

Slideshow Viewing

In some embodiments, smart processing engine 520 can output slideshows to one or more digital displays and surfaces simultaneously. For example, the system 500 can interface with multiple digital displays/surfaces via the slideshow output module 517. Examples of digital screens include: phones, tablets, laptops, computers, TVs, and/or other similar devices. The smart processing engine 520 can also output to multiple different device-enabled slideshow surfaces. For instance, Windows enables slideshows to be played on monitor backgrounds and lock screens. In some embodiments, the system 500 can be applied on a surface of a digital device. In some embodiments, the system 500 can play an aggregate slideshow from all groups simultaneously onto multiple screens and surfaces. The system 500 can also enable groups to be configured to output to specific screens and/or surfaces.

Media Flows

Figure 10:
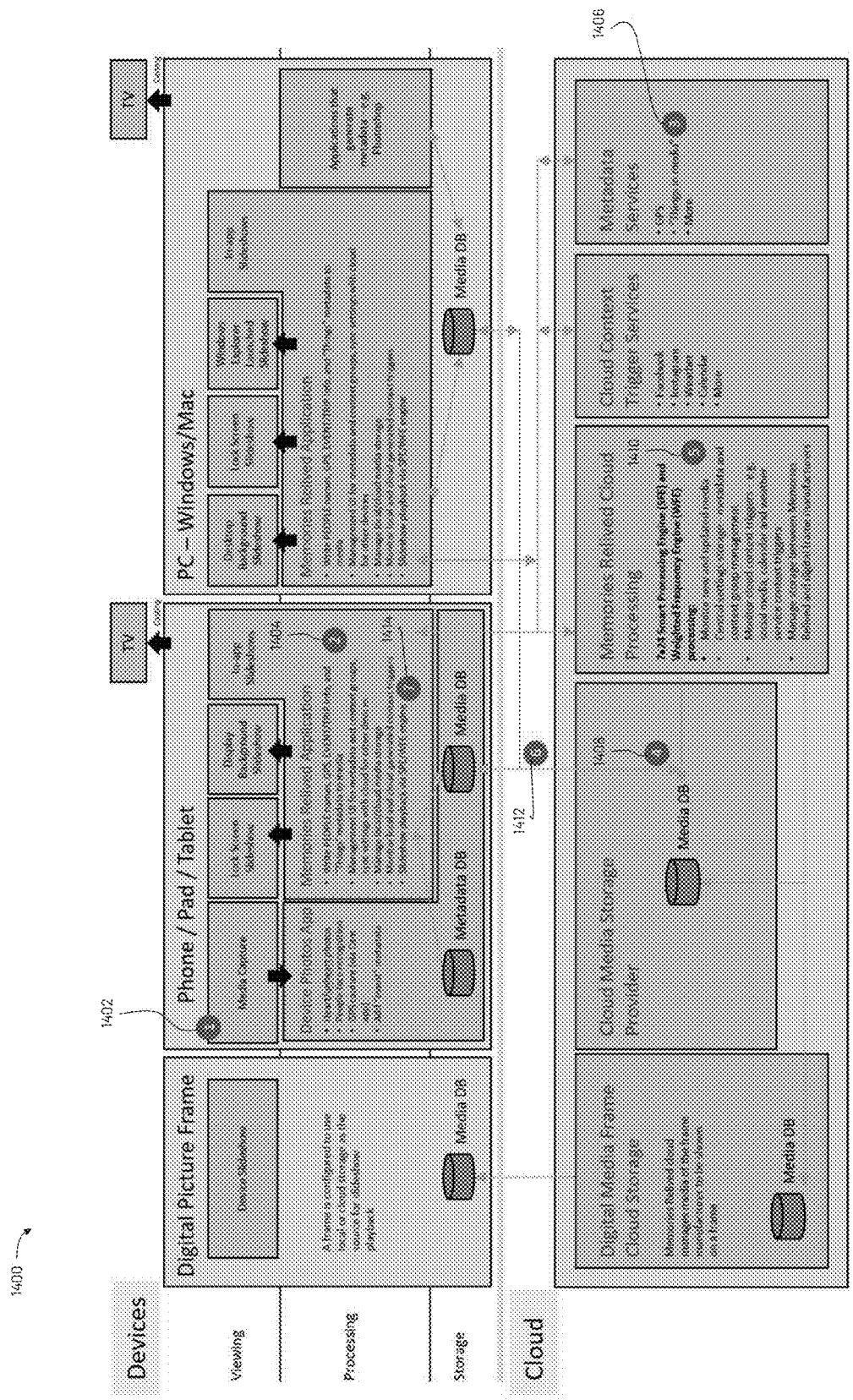
FIG. 10 illustrates an example method for dynamically altering media in slideshows in accordance with aspects of this disclosure.

This section describes examples of the lifecycle of media, from initial capture through being viewed in a slideshow on one/more devices in accordance with aspects of this disclosure. FIG. 10 illustrates an example method 1400 for dynamically altering media in slideshows in accordance with aspects of this disclosure. The method may be performed by the system 500 illustrated in any of FIGS. 1-8. The method 1400 of FIG. 10 is merely one example of how the system 500 can dynamically alter media, and can be modified in different ways without departing from aspects of this disclosure.

Example of Media Flow Throughout the System's Ecosystem: The User "Hearts" a Photo in the User's Phone's Photo App The method 1400 describes the lifecycle of newly-"hearted" photos on a phone and how those photos flows throughout the ecosystem to automatically become viewable on any device.

At step 1402, the application associated with the system 500 on a phone receives a notification that media has been "hearted" on the user's phone.

At step 1404, the system 500 can add the "heart" metadata to the media (e.g., setting a 5 out of 5 rating in EXIF metadata). The system 500 can also check the phone's photo app database to see if the media has GPS data. If GPS data exists, the system 500 can use a cloud service to convert GPS coordinates to city, state, and country and adds that metadata to the photo. The system 500 can also check the phone photo app's database to see if the media has people identified in the media. If people are identified in the photo, the system 500 can add people metadata to the photo.

At step 1406, the system 500 can use a third-party service to add "things found in media" metadata to the photo. For example, the third-party service can identify objects, activities, or other elements within the photo and add the metadata related to the identified objects, activities, or other elements to the photo.

At step 1408, the system 500 can copy the photo to a supported cloud storage service with updated metadata, overwriting media in the cloud if that media already existed.

At step 1410, the smart processing engine 520 can monitor cloud storage for new or updated media copied to the cloud from any device. In response to detecting new or updated media, the smart processing engine 520 can notify applications related to the system 500 running on devices that new or updated media is available for processing.

At step 1412, the application running on a device can receive a cloud notification that, in this example, notifies the application that a new hearted photo is available for viewing. The application running on that device can then copy the new/updated media from the cloud to local storage on the device. The smart processing engine 520 can determine if the photo is included in the search criteria for all enabled metadata groups—e.g., "recent media taken in the last 60 days that has been hearted".

At step 1414, the weighted frequency engine 5118 can decide what frequency to show the newly-hearted photo based on the weight given to the metadata group the search criteria found it—e.g., "hearted recent media taken in the last 60 days" has a high weight of 10 out of 10 which will show that photo at the highest possible frequency compared to media included in metadata or context groups with a lower weight.

The method 1400 can be performed for any scenario whenever media has been newly added on a phone, PC, and/or within cloud storage. For instance, the user newly adds a name of a family or friend in their phones Photo app; the user adds additional metadata to their media library via their PC or third-party software—e.g., Adobe Lightroom's face recognition software, or 100s of other metadata management applications on the market; and/or the user scans media from binders, shoeboxes, or video tape decks and adds that media to storage systems that the system 500 monitors.

Example of Context Triggers and the Flow of Notifications Throughout the System's Ecosystem: The Application Running on a Phone or PC Receives a Date/Time Trigger As an example, the following method describes the lifecycle of media when the smart processing engine 520 receives a date/time context trigger on the user's phone or PC.

The application associated with the system 500 running on the user's phone or PC receives a date/time trigger. In one example, the date/time trigger can be midnight on any given day.

The system 500 can go through all enabled context groups looking for a date/time condition. In this example, there is a context group defined as "show media captured on this day in history for the last 5 years."

The system 500 can first stop showing media from yesterday's day in history, being shown in the slideshow, as a result of yesterday's search for media with yesterday's date (unless that media was found in the search of another metadata or context group).

The system 500 can then perform a search on the local media store on the user's phone, cloud, or PC finding media captured on this day in the last 5 years and add the identified media to a running slideshow and a frequency defined by the weight given to that metadata group. The system 500 can show the media at a frequency defined by the group's weight—for instance, if the group's weight is defined as 5 on a scale of 10, that media will be shown half as much as recently captured, newly-hearted media, from the prior example, which has a weight of 10.

The above described example can also be applied in a similar way for other context triggers and context groups scenarios.

In one example, a date/time context group can be defined to find all "Spring" media from last year and show that media with a weight of 3, roughly a third of the frequency of newly captured hearted media with a weight of 10. In 2024, the summer solstice is Mar. 19, 2024. Then at midnight on Mar. 18, 2024, the system 500 can search for all media captured last year from March 19 through the summer solstice of Jun. 20, 2024, and show that media with a weight of 3 compared with other metadata and context groups.

In another example, the system 500 can monitor one of the user's social media networks to find family or friends whose birthday is within two weeks away. Once the system 500 finds a birthday, the system 500 will search all media for the first and/or last name of the person stored in metadata of the media and shows that media more often than other media. To enable the relevant experience of showing photos two weeks prior and showing those photos much more often the day before and especially the day of the birthday, the system 500 can create three context groups—one context group is defined with a weight of 3 for the fourteenth day through the second day before the birthday, a separate group has a weight of 7 the day before, and a separate group with a weight of 10 the day of the birthday.

In yet another example, a user can configure hardware devices that monitors faces in a room, the weather, home automation or other software services or hardware devices. When the system 500 receives a trigger from one of these services or hardware devices, the system 500 cam take action according to the rules of the context group. For instance: while someone is present in a room, show media with a weight of 10; and when it's storming out, show media with "happy things" in it with a weight of 5.

Figure 11:
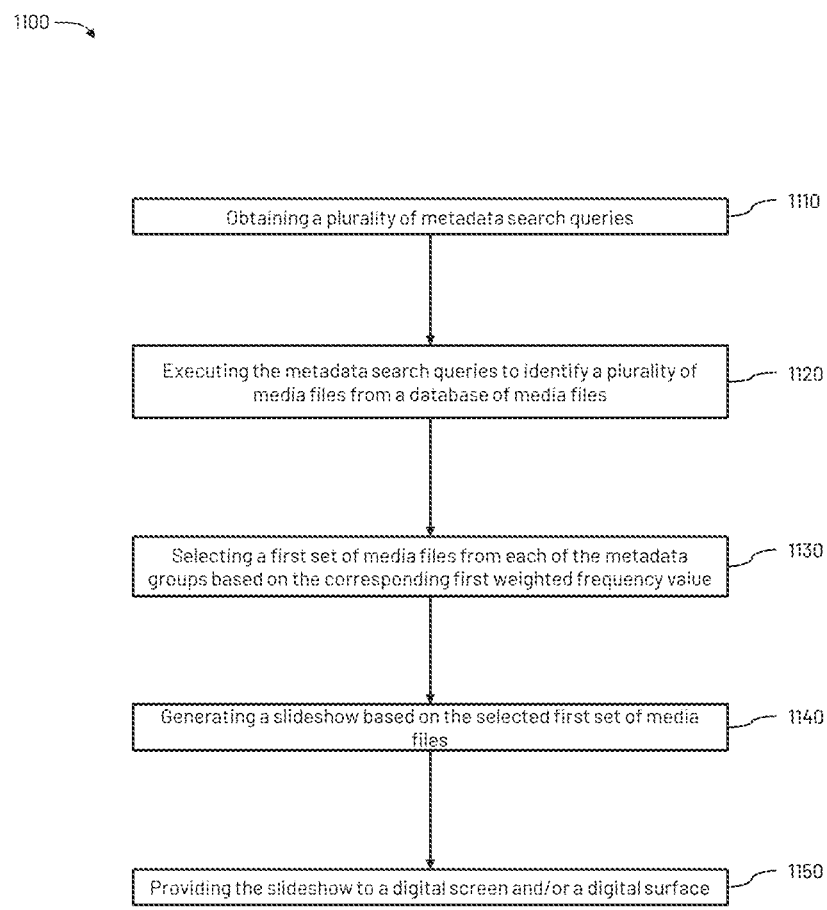
FIG. 11 illustrates a method for dynamically altering media slideshows in accordance with aspects of this disclosure.

FIG. 11 illustrates a method 1100 for dynamically altering media slideshows in accordance with aspects of this disclosure. One or more block of the method 1100 can be implemented, for example, by a processor, such as the system 500, the smart processing engine 520, and/or the weighted frequency engine 518.

At block 1110, the method 1100 involves obtaining a plurality of metadata search queries.

At block 1120, the method 1100 involves executing the metadata search queries to identify a plurality of media files from a database of media files. Each of the metadata search queries can generate a corresponding metadata group including the media files identified by the corresponding metadata search. Each of the metadata groups can also have a corresponding first weighted frequency value.

At block 1130, the method 1100 involves selecting a first set of media files from each of the metadata groups based on the corresponding first weighted frequency value.

At block 1140, the method 1100 involves generating a slideshow based on the selected first set of media files.

At block 1150, the method 1100 involves providing the slideshow to a digital screen and/or a digital surface.

EXAMPLES

Various example embodiments of the disclosure can be described by the following clauses:

Clause 1. A system for facilitating dynamic alteration of a media slideshow in real-time, comprising:
  at least one processor; and
  memory hardware in communication with the at least one processor, the memory hardware storing instructions that when executed on the at least one processor cause the at least one processor to perform operations comprising:
    executing, using a smart processing engine, metadata search queries to find media files, stored on a local or cloud drive, and
    executing, using a weighted frequency engine within the smart processing engine, search queries based on a weighted frequency algorithm, wherein the weighted frequency algorithm is configured to show more or less media files from one group compared to other groups, based on a value a user places on the group compared to other groups,
  wherein the smart processing engine is further configured to run the metadata search queries at a regular interval in order to find: i) new or removed media files stored on the local or cloud drive with metadata that satisfies one or more of the metadata search queries, and ii) existing media files with metadata that has been updated that satisfies the one or more of the metadata search queries, and
  wherein the smart processing engine is further configured to output the media files that satisfy the one or more of the metadata search queries to a digital screen and/or a digital surface in a slideshow format.

Clause 2. The system of Clause 1, wherein the instructions are further configured to cause the at least one processor to perform operations comprising:
  setting, by the weighted frequency engine, a weighted frequency value for one or more of a metadata group, a context group, and/or a folder group based on a user input using a management user interface, the weighted frequency value being within a weighted frequency number range,
  retrieving, using the smart processing engine, the media files based on the weighted frequency value for the metadata group, the context group, and/or the folder group.

The retrieved media files can include a list of personal media files, that matches the weighted frequency value of that group, a list of media files derived from running the query associated for each group (e.g., select 10 media with the word "bob" in its metadata). The system can output the selected media files from each enabled group to a digital screen(s) and/or digital surface(s) in a slideshow format, and in an order defined by the ordering rules for each group. This process of selecting media based on a weighted frequency value for a group, that matches search criteria for each group, and combining all selected media for playback on a digital surface is called a sample session (SS). In one example, the system can include:

The weighted frequency engine configured to uniquely select personal media files from a group, based on a weighted frequency value, never repeating a file previously selected, until all media files in the query result set of a group have been selected. Once all media in a group result set have been selected for viewing in the slideshow through successive sample sessions, the weighted frequency engine resets the selection process for that group and begins selecting media files from the entire query result set again.

The smart processing engine configured to select media files for a sample session based on a selection order setting, in one of two methods, which users configure via a management user interface:
  Shuffled order—e.g., media files are shuffled or randomly selected for a sample session,
  Ascending or descending order based on an EXIF or IPTC metadata field for selection—e.g., media files are selected based on the ascending order of the filename field, The smart processing engine can be configured to output the media files to a digital screen(s) and/or digital surface(s) based on a playback order setting, in one of two methods, which users configure via a management user interface:
  Shuffled order—media files are shuffled when output to a slideshow,
  Ascending or descending order based on an EXIF or IPTC metadata field—e.g., media files are viewed in an ascending order based on the filename field,
The weighted frequency engine is configured to use the system to execute media file selection and output to a slideshow as follows:
  i. Configuration:
    1. Current date is Mar. 31, 2023
    2. The system weighted frequency number range: e.g., 1-10
    3. Metadata group 1:
      a. Name: Favorite media from last two months
      b. Weighted frequency value: 10
      c. Query: rating: 5 stars datetaken: Feb. 1, 2023 . . . Mar. 31, 2023
      d. Selection order setting: Shuffle
      e. Number of media files from query: 25
    4. Metadata group 2:
      a. Name: Favorite media all-time
      b. Weighted frequency value: 3
      c. Query: rating: 5 stars
      d. Selection order setting: Shuffle
      e. Number of media files from query: 10
    5. Metadata group 3:
      a. Name: Favorite media this month last year
      b. Weighted frequency value: 5
      c. Query: rating: 5 stars datetaken: 3/*/2022
      d. Selection order setting: Shuffle
      e. Number of media files from query: 1
  ii. Execution:
    1. Sample session One (SS1):
      a. The weighted frequency engine will select:
        i. Metadata group 1:
          1. 10 media files randomly selected
          2. 15 media files remain for future sample sessions (25 media to start–10 in SS1=15 files left for selection in SS2)
        ii. Metadata group 2:
          1. 3 media files randomly selected
          2. 7 media files remain for future sample sessions (10 media to start–3 in SS1=7 left for SS2)
        iii. Metadata group 3:
          1. 1 media file selected, however the weighted frequency value is 5. The Weighted Frequency Engine will then select just that 1 media file when the weighted frequency value is higher than the number of available media
          2. In this example, this 1 media file will be selected 1 time in each sample session
          3. 1 media file remains for future sample sessions (1 media to start in SS1–1 in SS1=0, because there are 0 files remaining for selection, the Smart Processing Engine will re-run the query and again 1 file is the result of the query, that 1 file is available for SS2)
      b. The smart processing engine will then output all 14 (10+3+1) media files to a digital screen(s) and/or digital surface(s) in a slideshow in a shuffled order
    2. Sample session Two (SS2):
      a. The weighted frequency engine will select:
        i. Metadata group 1:
          1. 10 media files randomly selected
          2. 5 media files remain for future sample sessions (25 media to start–10 media in SS1–10 media in SS2=5 left SS3)
        ii. Metadata group 2:
          1. 3 media files randomly selected
          2. 4 media files remain for future sample sessions (10 media to start–3 media in SS1–3 media in SS2=4 media left for SS3)
        iii. Metadata group 3:
          1. 1 media file selected, select that 1 media file since the weighted frequency value is higher than the number of available media
          2. 1 media file remains for future sample sessions (1 media to start from SS2–1 in SS3=0, the Smart Processing Engine will re-run the query and again 1 file is the result of the query, that 1 file is available for SS3
      b. The Smart Processing Engine will then output all 14 (10+3+1) media files to a digital screen(s) and/or digital surface(s) in a slideshow in a shuffled order
    3. Sample session Three (SS3):
      a. The weighted frequency engine will select:
        i. Metadata group 1:
          1. 5 remaining media files to select from, which completes selection of all 25 files
          2. 5 more media files are needed to meet the weighted frequency value of 10
          3. The weighted frequency engine then reruns the search for this group and all 25 media files are again available to fulfill the remaining 5 media files
          4. the weighted frequency engine selects 5 more files randomly from all 25 media files
          5. 20 media files remain for future sample sessions (25 to start–5 media from SS3=20 media left for SS4)
        ii. Metadata group 2:
          1. 3 media files randomly selected
          2. 1 media file remains for future selection (10–3–3–3)
        iii. Metadata group 3:
          1. 1 media file selected, select that 1 media file when the weighted frequency value is higher than the number of available media
          2. 1 media file remains for future sample sessions (1 media to start from SS2–1 in SS3=0, the Smart Processing Engine will re-run the query and again 1 file is the result of the query, that 1 file is available for SS4
      b. The smart processing engine will then output all 14 (10+3+1) media files to a digital screen(s) and/or digital surface(s) in a slideshow in a shuffled order
    4. 10 photos were newly taken on a phone, the user "favorited" 10 photos (an EXIF rating field set to 5), and the system 500 copied all 10 media to the file storage system that the smart processing engine monitors as the source for group and folder selection
      a. Because the smart processing engine reruns queries and monitors file system folders every one second (a configurable value), and because there is a metadata group that is defined to find all media files with a rating of 5 (favorited), and media taken over the last 2 months, all 10 of these media files were automatically added to metadata group 1 bringing the total media available for metadata group 1 to 35
5. Sample session 4 (SS4):
   a. The weighted frequency engine will select:
      i. Metadata group 1:
         1. 10 new media files were added to this group, this group now has 35 media files overall, 30 files are now available for selection–20 from sample session three+10 new files
         2. 10 media files are randomly selected from the 30 available
         3. 20 media files remain for future sample sessions (30–10)
      ii. Metadata group 2:
         1. 1 media file selected, which completes selection of all 10 files
         2. 2 more media files are needed to meet the weighted frequency value of 3
         3. The weighted frequency engine reruns the search criteria for this group, all 10 media files are again available
         4. The weighted frequency engine selects 2 more files randomly
         5. 8 media files remain for future sample sessions (10–2)
      iii. Metadata group 3:
         1. 1 media file selected, select that 1 media file when the weighted frequency value is higher than the number of available media
         2. 1 media file remains for future sample sessions (1 media to start from SS3–1 in SS4=0, the Smart Processing Engine will re-run the query and again 1 file is the result of the query, that 1 file is available for future sample sessions
   b. The smart processing engine will then output all 14 (10+3+1) media files to a digital screen(s) and/or digital surface(s) in a slideshow in a shuffled order Clause 3. The system of Clause 1 or 2, wherein the instructions are further configured to cause the at least one processor to perform operations comprising setting metadata, folder, and context groups to be enabled or disabled, including a management user experience for users to set the value, wherein the enabled setting instructs the smart processing engine to execute the groups settings for possible inclusion in the output of a slideshow.

Clause 4. The system of any of Clauses 1-3, wherein the instructions are further configured to cause the at least one processor to perform operations comprising setting metadata, folder, and context groups to specify a static metadata search query string to execute upon metadata and folder groups being enabled, or for context groups after they receive a trigger.

Clause 5. The system of any of Clauses 1-4, wherein the instructions are further configured to cause the at least one processor to perform operations comprising setting context groups to specify a dynamic metadata search query string to execute based on the trigger itself. For instance, when the weather sensor detects rain, create a dynamic metadata query string that finds sun-related artifacts in media.

Clause 6. The system of any of Clauses 1-5, wherein the instructions are further configured to cause the at least one processor to perform operations comprising setting context groups to start and/or stop showing media from a group to a slideshow on a specific date and/or time. For example, the system can find and show all media taken on this day in history from midnight last night until midnight tonight. This can be achieved when metadata and folder groups are enabled or for context groups when they receive a trigger.

Clause 7. The system of any of Clauses 1-6, wherein the instructions are further configured to cause the at least one processor to perform operations comprising setting context groups to start and/or stop showing media from a group in a slideshow based on a trigger. For example, begin showing the metadata group "All members of our extended family" when the faces of 3 family members are in a room and end showing that metadata group when the faces of less than 3 are present in the room.

Clause 8. The system of any of Clauses 1-6, wherein the instructions are further configured to cause the at least one processor to perform operations comprising setting context groups to start or stop showing media in a slideshow for a duration of days/time prior to and after a context trigger. For example, find and show media of a friend's birthday for 14 days prior and 2 days after their birthday.

Clause 9. The system of any of Clauses 1-8, wherein the instructions are further configured to cause the at least one processor to perform operations comprising setting context groups to control slideshow playback after a context trigger. For instance, change duration of media playback, transition types, shuffle or ordered playback, or whether to pause, go back, or go forward in a slideshow.

Clause 10. The system of any of Clauses 1-9, wherein the instructions are further configured to cause the at least one processor to perform operations comprising setting context groups to enable, disable, or pause any group type; for one, some, or all enabled groups; and for a duration of days/time, on a specific date and/or time, indefinitely, or until another context trigger is encountered. For instance, when a person enters the room, pause all groups, show media files of that person, until that person leaves the room, then reenable all previously enabled groups.

Clause 11. The system of any of Clauses 1-10, wherein the instructions are further configured to cause the at least one processor to perform operations comprising:
   creating and naming, by the smart processing engine, a plurality of context groups for hardware and/or software sensors based on user input, the context groups configured to enable users to define a metadata search query within that context group, a search query to be executed upon receiving a trigger from a hardware or software sensor, to search personal metadata stored within media files stored on a local or cloud drive,
   configuring, using the smart processing engine, one or more hardware or software triggers within a single context group, including "OR" and "AND" logic for each trigger, for example, if between 8:00-10:00 pm AND facial recognition recognizes a person AND it's raining outside, find media with that person in sunny-related media,
   managing the context groups based on user input received via an application user interface,
   listening, using a context listener component of the smart processing engine, for hardware and software context triggers, for example, specific weather conditions, the presence of a person in a room, biometric events, calendar events, social media events, etc., and
   in response to receiving a context trigger, initiating a search, defined within the context group(s) attached to a hardware or software sensor, that upon searching a local or cloud media storage location, takes media files who satisfy the search criteria and outputs those media files to a digital screen(s) and/or digital surface(s) in a slideshow format.

Clause 12. The system of any of Clauses 1-11, wherein the instructions are further configured to cause the at least one processor to perform operations comprising using a location (GPS) sensor trigger that dynamically monitors and captures the current location of a person, where a media slideshow is being played, to alter media files shown in that slideshow (retrieving media files to be shown based on metadata search criteria) and/or altering playback settings for the slideshow experience (start, stop, pause, advance an item, backup an item . . . ) as a result of the trigger—e.g., "select and show all media with my current location for GPS coordinates".

Clause 13. The system of any of Clauses 1-12, wherein the instructions are further configured to cause the at least one processor to perform operations comprising using a date and/or time sensor trigger that dynamically monitors and captures the current date and time, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "using today's date, select and show all media in history on this date" or "using today's date, select and show media within this season—e.g., summer".

Clause 14. The system of any of Clauses 1-13, wherein the instructions are further configured to cause the at least one processor to perform operations comprising using a weather sensor trigger that dynamically monitors and captures weather-related conditions such as rain, snow, sun, clouds, day, night, wind, and other weather-related states, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if it's raining, select and media with sun, beach . . . ".

Clause 15. The system of any of Clauses 1-14, wherein the instructions are further configured to cause the at least one processor to perform operations comprising using a speed sensor trigger that dynamically monitors and captures speed related to a person where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if going over 500 mph, select and show media of airplanes".

Clause 16. The system of any of Clauses 1-15, wherein the instructions are further configured to cause the at least one processor to perform operations comprising using a direction sensor trigger that dynamically monitors and captures the direction a person is moving, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if moving in a southerly direction, select and show media from all GPS locations south of where the person is heading, based on going that direction".

Clause 17. The system of any of Clauses 1-16, wherein the instructions are further configured to cause the at least one processor to perform operations comprising using an elevation sensor trigger that dynamically monitors and captures the elevation of a person, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if above 2000 feet elevation and the location sensor has a GPS coordinate in the mountains, select and show media of hiking or media of my significant other and I hiking".

Clause 18. The system of any of Clauses 1-17, wherein the instructions are further configured to cause the at least one processor to perform operations comprising using a facial recognition sensor trigger that dynamically monitors and captures a person's face, where a media slideshow is being played, with the intent of altering media files shown in that slideshow (retrieving media files to be shown based on metadata search criteria) or altering playback settings for the slideshow experience (start, stop, pause, advance an item, backup an item . . . ) as a result of the trigger—e.g., "if person detected, find name, select and show media of that person".

Clause 19. The system of any of Clauses 1-18, wherein the instructions are further configured to cause the at least one processor to perform operations comprising using a mood sensor trigger that dynamically monitors and captures a person's mood such as joy, happiness, anger, and other related emotions, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if sad, select and show media with happy things in them—e.g., people smiling".

Clause 20. The system of any of Clauses 1-19, wherein the instructions are further configured to cause the at least one processor to perform operations comprising using a taste sensor trigger that dynamically monitors and captures a person's taste such as sweet, bitter, and other tasted related descriptions, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if bitter, select and show media with bitter things in them".

Clause 21. The system of any of Clauses 1-20, wherein the instructions are further configured to cause the at least one processor to perform operations comprising using a smell sensor trigger that dynamically monitors and captures a person's smell such as floral, smoky and other smell related descriptions, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if floral, select and show media with flowers in them".

Clause 22. The system of any of Clauses 1-21, wherein the instructions are further configured to cause the at least one processor to perform operations comprising using a sight sensor trigger that dynamically monitors and captures what a person currently is seeing such as mountain or baseball and other such seeing related descriptions, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if looking at a baseball, select and show media with baseballs in them or media of the kids playing at baseball games".

Clause 23. The system of any of Clauses 1-22, wherein the instructions are further configured to cause the at least one processor to perform operations comprising using a touch sensor trigger that dynamically monitors and captures what a person is touching such as cup, laptop, scissors or other such touch related descriptions, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if holding a cup, select and show media with cups in them".

Clause 24. The system of any of Clauses 1-23, wherein the instructions are further configured to cause the at least one processor to perform operations comprising using a sensor trigger sourced from a social media platform, calendar software, or other similar source, that dynamically monitors and captures friend and family birthday's, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if Sue's birthday is in 14 days, select and show media with Sue in them".

Clause 25. The system of any of Clauses 1-24, wherein the instructions are further configured to cause the at least one processor to perform operations comprising using a sensor trigger sourced from a social media platform, search engine, news outlet, or other similar source, that dynamically monitors and captures trending topics, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if New Years Eve is a trending topic, select and show media with New Years Eve artifacts in them or media of my significant other and I during New Years events".

Clause 26. The system of any of Clauses 1-25, wherein the instructions are further configured to cause the at least one processor to perform operations comprising using a sensor trigger sourced from a social media platform, search engine, news outlet, or other similar source, that dynamically monitors and captures events of interest for a person, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if a concert near me is trending, select and show media with concert artifacts in them or media of concerts my significant other and I have attended".

Clause 27. The system of any of Clauses 1-26, wherein the instructions are further configured to cause the at least one processor to perform operations comprising using a calendar software sensor trigger, or other similar source, that dynamically monitors and captures events such as when an event starts and stops, duration, attendees, title and body descriptive text (such as a birthday, an anniversary or other annual special event), and other event related descriptive text, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if Bob and Sue anniversary is in 14 days, select and show media from past anniversaries of Bob and Sue".

Clause 28. The system of any of Clauses 1-27, wherein the instructions are further configured to cause the at least one processor to perform operations comprising using a TV media sensor trigger that dynamically monitors and captures television service information such as what channel and show is currently on, genre, MPAA rating, and other television related information, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if tennis channel is on, select and show media with tennis artifacts in them or media of tennis events my significant other and I have been to".

Clause 29. The system of any of Clauses 1-28, wherein the instructions are further configured to cause the at least one processor to perform operations comprising using a music media sensor trigger that dynamically monitors and captures music service information such as what song is being played, artist, information about the song being played (e.g., beats-per-minute, genre), explicit rating, and other song related data, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if a high beats-per-minute is playing, select and show media with exercise related artifacts in them".

Clause 30. The system of any of Clauses 1-29, wherein the instructions are further configured to cause the at least one processor to perform operations comprising using a gaming media sensor trigger that dynamically monitors and captures gaming information such as what game is being played, information about the game being played (e.g., title, genre, etc.), game rating, and other related game data, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if playing Guitar Hero, select and show media with guitars in them".

Clause 31. The system of any of Clauses 1-30, wherein the instructions are further configured to cause the at least one processor to perform operations comprising using a door home automation sensor trigger that dynamically monitors and captures door information such as if a door is opened/closed, locked/unlocked or other door related data, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if a door is open, select and show a 'warning door open' image every 10 seconds".

Clause 32. The system of any of Clauses 1-31, wherein the instructions are further configured to cause the at least one processor to perform operations comprising using a window home automation sensor trigger that dynamically monitors and captures window information such as if a window is opened/closed, locked/unlocked and other window related home automation data, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if a window is open, select and show a 'warning window open' image every 10 seconds".

Clause 33. The system of any of Clauses 1-32, wherein the instructions are further configured to cause the at least one processor to perform operations comprising using a lighting automation sensor trigger that dynamically monitors and captures lighting information such as if a light or group of lights are on/off or dimmed or other lighting related home automation data, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if lighting in a room is dimmed, select and show media of darker images".

Clause 34. The system of any of Clauses 1-33, wherein the instructions are further configured to cause the at least one processor to perform operations comprising using a security camera home automation sensor trigger that dynamically monitors and captures security camera information such as security camera rules and if a camera detects motion/no motion and other related security related data, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if motion is detection by a camera and it's after 10:00 pm, select and show a 'warning motion outside" image every 10 seconds".

Clause 35. The system of any of Clauses 1-34, wherein the instructions are further configured to cause the at least one processor to perform operations comprising using a state sensor trigger that dynamically monitors and captures state change information such as hardware and software state changes, where a media slideshow is being played, with the intent of altering media files shown in that slideshow (retrieving media files to be shown based on metadata search criteria) and/or altering playback settings for the slideshow experience (start, stop, pause, advance an item, backup an item . . . ) as a result of the trigger—e.g., "if a user sets 'Party Mode' in a software app (a sensor), select and show media of party artifacts in them or media where my significant other and I have hosted past parties" or "if a phone is tilted, advance to the next media file in the slideshow".

Clause 36. The system of any of Clauses 1-35, wherein the instructions are further configured to cause the at least one processor to perform operations comprising using a pluggable architecture that enables developers to create hardware or software context triggers and custom behavior once triggered.

Clause 37. The system of any of Clauses 1-36, wherein the instructions are further configured to cause the at least one processor to perform operations comprising:
  receiving context triggers,
  executing a search query, on a local or cloud drive,
  finding media files that satisfy a context groups search criteria, and
  outputting the media files to a digital screen(s) and/or digital surface(s) in a slideshow format.

Clause 38. The system of any of Clauses 1-37, wherein the instructions are further configured to cause the at least one processor to perform operations comprising:
  creating and naming a metadata group, using the smart processing engine, that enables users to define a metadata search query within that metadata group via an application user interface,
  assigning, using the weighted frequency engine, a weight to a first metadata group of the metadata groups that defines the first metadata group's value compared to other metadata groups, and
  executing, using the smart processing engine, the search query for the first metadata group, and
  outputting media files that satisfy the search query to a digital screen(s) and/or digital surface(s) in a slideshow format.

Clause 39. The system of any of Clauses 1-38, wherein the instructions are further configured to cause the at least one processor to perform operations comprising using the smart processing engine to output the media files in a slideshow format to a desktop background of one or more computer monitors.

Clause 40. The system of any of Clauses 1-39, wherein the instructions are further configured to cause the at least one processor to perform operations comprising using the smart processing engine to output the media files in a slideshow format to a computer lock screen.

Clause 41. The system of any of Clauses 1-40, wherein the instructions are further configured to cause the at least one processor to perform operations comprising using the smart processing engine to output the media files in a slideshow format to a digital picture frame device.

Clause 42. The system of any of Clauses 1-41, wherein the instructions are further configured to cause the at least one processor to perform operations comprising using the smart processing engine to output the media files in a slideshow format from one digital computing device to a digital computing device's screen, e.g., cast a slideshow from a cellular phone to a television.

Clause 43. The system of any of Clauses 1-42, wherein the instructions are further configured to cause the at least one processor to perform operations comprising using the smart processing engine to output the media files in a slideshow format simultaneously to a plurality of screens and surfaces.

Clause 44. The system of any of Clauses 1-43, wherein the instructions are further configured to cause the at least one processor to perform operations comprising configuring the smart processing engine via a management user interface to output one or more enabled groups to a specific screen or surface.

Clause 45. The system of any of Clauses 1-44, wherein the instructions are further configured to cause the at least one processor to perform operations comprising:
  incorporating authorized media from a plurality of other individuals,
  including the authorized media in metadata, folder, and context groups, applying group rules apply to the authorized media,
selecting, using the weighted frequency engine, the authorized media, and
display the selected authorized media alongside the media files for viewing on a digital display device.

Clause 46. The system of any of Clauses 1-45, wherein the instructions are further configured to cause the at least one processor to perform operations comprising:
compiling and running the system into an application that can be run on any digital platform including a phone, computer, tablet, single-processor device (e.g., a Raspberry Pi), and cloud computing systems, where the smart processing engine and/or media file storage can be local on a device or run in the cloud.

CONCLUSION

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. A processor can receive instructions and data from a read only memory or a random-access memory or both. The essential elements of a computer are a processor for performing instructions and one or more memory devices for storing instructions and data. A computer can include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system for dynamically altering media slideshows, comprising:
at least one interface configured to provide a slideshow to at least one of a digital screen and a digital surface;
at least one processor; and
memory hardware in communication with the at least one processor, the memory hardware storing instructions that when executed on the at least one processor cause the at least one processor to perform operations comprising:
obtaining a plurality of metadata search queries;
executing the metadata search queries to identify a plurality of media files from a database of media files, each of the metadata search queries generating a corresponding metadata group including the media files identified by the corresponding metadata search, and each of the metadata groups having a corresponding first weighted frequency value, wherein executing the metadata search queries is performed at a regular interval in order to find: i) new or removed media files from the database of media files that satisfies one or more of the metadata search queries, and ii) existing media files within the database of media files with metadata that has been updated that satisfies the one or more of the metadata search queries;
selecting a first set of media files from each of the metadata groups based on the corresponding first weighted frequency value; and
generating the slideshow based on the selected first set of media files.

2. The system of claim 1, wherein the instructions are further configured to cause the at least one processor to perform operations comprising:

creating a folder group including a user selection of the media files from the database of media files, the folder group including a corresponding second weighted frequency value; and selecting a second set of media files from the folder group based on the corresponding second weighted frequency value, wherein generating the slideshow is further based on the selected second set of media files.

3. The system of claim 1, wherein the instructions are further configured to cause the at least one processor to perform operations comprising:

creating a context group including a context rule and a context trigger, the context group including a corresponding third weighted frequency value; and in response to detecting the triggering of the context trigger:
selecting a third set of media files from the database of media files based on the context rule, and
modifying the slideshow to include at least some of the third set of media files based on the third weighted frequency value.

4. The system of claim 3, wherein modifying the slideshow is performed while the slideshow is being displayed on the at least one of the digital screen and the digital surface.

5. The system of claim 3, further comprising:
a context sensor configured to detect changes in an environment of the at least one of the digital screen and the digital surface,
wherein detecting the triggering of the context trigger is further based on the detected changes in the environment.

6. The system of claim 1, wherein the instructions are further configured to cause the at least one processor to perform operations comprising:

creating a folder group including a user selection of the media files from the database of media files, the folder group including a corresponding second weighted frequency value;

creating a context group including a context rule and a context trigger, the context group including a corresponding third weighted frequency value; and selecting a second set of media files and a third set of media files from the folder group based on the second and third weighted frequency values, wherein generating the slideshow is further based on the selected second and third sets of media files.

7. The system of claim 6, further comprising:
a management user interface configured to receive a user input,
wherein the instructions are further configured to cause the at least one processor to perform operations comprising:
setting the first, second, and third weighted frequency values based on the user input, the first, second, and third weighted frequency values being within a weighted frequency number range.

8. The system of claim 1, wherein the database of media files is stored in the cloud.

9. A method, comprising:
obtaining a plurality of metadata search queries;
executing the metadata search queries to identify a plurality of media files from a database of media files, each of the metadata search queries generating a corresponding metadata group including the media files identified by the corresponding metadata search, and each of the metadata groups having a corresponding first weighted frequency value, wherein executing the metadata search queries is performed at a regular interval in order to find: i) new or removed media files from the database of media files that satisfies one or more of the metadata search queries, and ii) existing media files within the database of media files with metadata that has been updated that satisfies the one or more of the metadata search queries;

selecting a first set of media files from each of the metadata groups based on the corresponding first weighted frequency value;

generating a slideshow based on the selected first set of media files; and providing the slideshow to at least one of a digital screen and a digital surface.

10. The method of claim 9, further comprising:
creating a folder group including a user selection of the media files from the database of media files, the folder group including a corresponding second weighted frequency value; and selecting a second set of media files from the folder group based on the corresponding second weighted frequency value, wherein generating the slideshow is further based on the selected second set of media files.

11. The method of claim 9, further comprising:
creating a context group including a context rule and a context trigger, the context group including a corresponding third weighted frequency value; and in response to detecting the triggering of the context trigger:
selecting a third set of media files from the database of media files based on the context rule, and
modifying the slideshow to include at least some of the third set of media files based on the third weighted frequency value.

12. The method of claim 11, wherein modifying the slideshow is performed while the slideshow is being displayed on the at least one of the digital screen and the digital surface.

13. The method of claim 11, further comprising:
detecting, using a context sensor, changes in an environment of the at least one of the digital screen and the digital surface,
wherein detecting the triggering of the context trigger is further based on the detected changes in the environment.

14. The method of claim 9, further comprising:
creating a folder group including a user selection of the media files from the database of media files, the folder group including a corresponding second weighted frequency value;

creating a context group including a context rule and a context trigger, the context group including a corresponding third weighted frequency value; and selecting a second set of media files and a third set of media files from the folder group based on the second and third weighted frequency values, wherein generating the slideshow is further based on the selected second and third sets of media files.

15. The method of claim 14, further comprising:
receiving, from a management user interface, a user input; and
setting the first, second, and third weighted frequency values based on the user input, the first, second, and third weighted frequency values being within a weighted frequency number range.

16. The method of claim 9, wherein the database of media files is stored in the cloud.

17. A non-transitory computer-readable medium having stored therein instructions that, when executed by data processing hardware, cause the data processing hardware to:
- obtain a plurality of metadata search queries;
- execute the metadata search queries to identify a plurality of media files from a database of media files, each of the metadata search queries generating a corresponding metadata group including the media files identified by the corresponding metadata search, and each of the metadata groups having a corresponding first weighted frequency value, wherein executing the metadata search queries is performed at a regular interval in order to find: i) new or removed media files from the database of media files that satisfies one or more of the metadata search queries, and ii) existing media files within the database of media files with metadata that has been updated that satisfies the one or more of the metadata search queries;
- select a first set of media files from each of the metadata groups based on the corresponding first weighted frequency value;
- generate a slideshow based on the selected first set of media files; and
- provide the slideshow to at least one of a digital screen and a digital surface.

* * * * *